(12) United States Patent
Siebert et al.

(10) Patent No.: US 10,391,404 B2
(45) Date of Patent: Aug. 27, 2019

(54) UNIFIED PLATFORM FOR A PLURALITY OF TITLES AND GAMING DEVICES

(71) Applicant: Microsoft Technology Licensing, LLC, Redmond, WA (US)

(72) Inventors: Michael Siebert, Redmond, WA (US); Thomas A. Langan, Seattle, WA (US); Antonio Vargas Garcia, Redmond, WA (US); Justin Brown, Seattle, WA (US); Gregory M. Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 345 days.

(21) Appl. No.: 15/143,211

(22) Filed: Apr. 29, 2016

(65) Prior Publication Data

US 2017/0312637 A1 Nov. 2, 2017

(51) Int. Cl.
*A63F 13/79* (2014.01)
*A63F 13/85* (2014.01)

(52) U.S. Cl.
CPC .............. *A63F 13/79* (2014.09); *A63F 13/85* (2014.09); *A63F 2300/209* (2013.01)

(58) Field of Classification Search
CPC ................................ A63F 13/79; A63F 13/85
See application file for complete search history.

(56) References Cited

U.S. PATENT DOCUMENTS

| | | |
|---|---|---|
| 5,359,510 A | 10/1994 | Sabaliauskas |
| 7,354,345 B2 | 4/2008 | Bortnik et al. |
| 7,682,251 B2 | 3/2010 | Bortnik et al. |
| 8,578,338 B2 | 11/2013 | Nguyen |
| 8,641,507 B2 | 2/2014 | Kelly et al. |

(Continued)

OTHER PUBLICATIONS

Bruegge, et al., "Example of a Problem Statement: Introduction into ARENA", Retrieved on: Feb. 11, 2016 Available at: http://www.cs.bilkent.edu.tr/~ugur/teaching/cs319/material/ch03lect2_UD.ppt.

(Continued)

*Primary Examiner* — James S. McClellan
*Assistant Examiner* — Kevin M Carter
(74) *Attorney, Agent, or Firm* — Arent Fox, LLP

(57) ABSTRACT

A unified platform supports a plurality of game titles and diverse gaming devices to provide publishers and developers with a software development kit (SDK) including application programming interfaces (APIs) for creating multiplayer tournaments. Developers use the SDK to create tournament definitions and permission levels for tournament organizers. Tournament definitions specify configuration values as parameters the unified platform uses to create instances of multiplayer tournaments. Permission levels can define which tournament organizers are able to set up and manage tournaments and can define parameters to which they must adhere. The unified platform can store tournament definitions that are created by game publishers, game developers, or tournament organizers and can use the stored definitions to create tournament instances. The unified platform can use APIs to expose created tournament instances for registration of spectators and players and can use APIs to track tournament play and provide updates corresponding to the progress.

15 Claims, 13 Drawing Sheets

(56) References Cited

U.S. PATENT DOCUMENTS

| | | | |
|---|---|---|---|
| 8,821,271 B2 | 9/2014 | Davison et al. | |
| 9,072,976 B1 | 7/2015 | Coppersmith, III et al. | |
| 9,373,223 B1* | 6/2016 | Webb | G07F 17/323 |
| 9,479,602 B1* | 10/2016 | Paradise | H04L 67/18 |
| 2002/0142842 A1 | 10/2002 | Easley et al. | |
| 2003/0050976 A1* | 3/2003 | Block | G06Q 10/10 709/203 |
| 2005/0043094 A1* | 2/2005 | Nguyen | G07F 17/32 463/42 |
| 2006/0241795 A1 | 10/2006 | Weingardt et al. | |
| 2007/0099683 A1* | 5/2007 | Panther Trice | G06Q 30/02 463/1 |
| 2007/0233585 A1 | 10/2007 | Ben Simon et al. | |
| 2008/0108404 A1* | 5/2008 | Iddings | G07F 17/32 463/16 |
| 2008/0220870 A1 | 9/2008 | Zavolas et al. | |
| 2008/0300039 A9 | 12/2008 | Kelly et al. | |
| 2009/0298576 A1* | 12/2009 | Nguyen | G07F 17/32 463/25 |
| 2010/0105454 A1* | 4/2010 | Weber | G06Q 30/02 463/1 |
| 2010/0223115 A1 | 9/2010 | Chodosh et al. | |
| 2011/0250968 A1* | 10/2011 | Os | A63F 13/795 463/42 |
| 2011/0300943 A1* | 12/2011 | Devine | H04L 29/1232 463/42 |
| 2012/0077570 A1* | 3/2012 | Kelly | G07F 17/3267 463/25 |
| 2012/0244948 A1* | 9/2012 | Dhillon | G06Q 30/0209 463/42 |
| 2013/0167162 A1* | 6/2013 | Fernandez | G06F 17/3089 719/328 |
| 2013/0331192 A1* | 12/2013 | Betti | A63F 13/12 463/42 |
| 2014/0038724 A1 | 2/2014 | Layne, IV et al. | |
| 2015/0045110 A1 | 2/2015 | Lempel et al. | |
| 2016/0019746 A1* | 1/2016 | Lyons | G07F 17/3211 463/25 |
| 2016/0180647 A1* | 6/2016 | Webb | G07F 17/3258 463/27 |
| 2016/0354688 A1* | 12/2016 | Harkham | A63F 13/35 |

OTHER PUBLICATIONS

"Competitive Gaming Platform FACEIT Raises $15 Million in Series A Financingfrom Anthos Capital, Index Ventures, and United Ventures", Published on: Jan. 26, 2016 Available at: https://play.faceit.com/competitive-gaming-platform-faceit-raises-15-million-in-series-a-financingfrom-anthos-capital-index-ventures-and-united-ventures/.

"Tournaments API", Retrieved on: Feb. 11, 2016, Available at: https://developer.riotgames.com/docs/tournaments-api.

"Challonge Match Display—application helping tournaments run faster", Published on: Sep. 15, 2014, Available at: http://smashboards.com/threads/challonge-match-display-application-helping-tournaments-run-faster.358186/.

Corem, et al., "Got skillz?: player matching, mastery, and engagement in skill-based games", In Proceedings of the First International Conference on Gameful Design, Research, and Applications, Oct. 2, 2013, pp. 115-118.

"FACEIT Competitive Gaming Platform to Integrate with Xbox Live Tournaments Platform", Published on: Mar. 16, 2016, Available at: https://play.faceit.com/faceit-competitive-gaming-platform-to-integrate-with-xbox-live-tournaments-platform/.

"Getting Started with Fuel", Published on: Nov. 1, 2014, Available at: https://www.fuelpowered.com/documentation.

"How it works", Published on: Jun. 25, 2014, Available at: http://cashplay.co/features/.

"Razer Arena Developer Portal", Published on: Jan. 25, 2015 Available at: http://developer.razerzone.com/arena/.

"Tournaments API", Published on: Mar. 4, 2016 Available at: https://developer.riotgames.com/docs/tournaments-api.

Yeung, Ken, "Grantoo moves beyond Web games, launches its Propeller SDK to extend reach to iOS and Android apps", Published on: Jan. 16, 2013, Available at: http://thenextweb.com/insider/2013/01/16/grantoo-launches-propeller-sdk/#gref.

* cited by examiner

```xml
<tournamentDefinition name="Holidays">
  <displayName>HOLIDAYS_NAME</displayName>
  <description>HOLIDAYS_DESCRIPTION</description>
  <registration>
    <duration>12h</duration>
    <maxTeamCount>1024</maxTeamCount>
    <minTeamCount>32</minTeamCount>
  </registration>
  <teams>
    <sessionTemplate>TeamSessionTemplate</sessionTemplate>
    <minPlayers>4</minPlayers>
    <maxPlayers>4</maxPlayers>
  </teams>
  <stages>
    <singleElimination>
      <rounds>
        <duration>15m</duration>
        <parallel>false</parallel>
        <tolerance>5m</tolerance>
        <default>disqualify</default>
      </rounds>
    </singleElimination>
  </stages>
  <instances>
    <once name="IndependenceDay">
      <registration>
        <startUtc>7/3/2015 2:00:00 PM</startUtc>
      </registration>
    </once>
    <once name="LaborDay">
      <registration>
        <startUtc>9/6/2015 3:00:00 PM</startUtc>
      </registration>
    </once>
  </instances>
</tournamentDefinition>
```

Properties
```
{
    "name":"$loc:tournament_name",
    "description":"$loc:tournament_description",
    "organizer":{
        "name":"Other Ocean",
        "url":"http://www.otherocean.com/"
    },
    "strings":{
        "tournament_name":{
            "en-US":"Casual Fridays"
        },
        "tournament_description":{
            "en-US":"Relax playing against other casual players"
        }
    }
}
```

604

Configuration
```
{
    "registration":{
        "start":"2015-06-16T17:00:00.0000000Z",
        "end":"2015-06-16T18:00:00.0000000Z",
        "maxTeams":100
    },
    "teams":{
        "sessionTemplate":"CasualTeamSession",
        "minMembers":4,
        "maxMembers":4
    },
    "stages":[{
      "start":"2015-06-16T19:00:00.0000000Z",
      "mode":{
        "style":"singleElimination"
      },
      "rounds":{
          "minLength":"30m",
          "parallel":false,
          "defaultAfter":"5m",
          "defaultAction":"disqualifyIfNotPresent",
      }
    }]
}
```

FIG. 6

```
{
    'constants':{
        'system':{
            'capabilities':{
                'team':true
            }
        }
    }
        'servers':{
        'tournaments':{
            'constants':{
                'system':{
                    'tournamentRef':'FaceItTournaments~12345'
                }
            },
            'properties':{
                'system':{
                    'registrationState':'registered',
                    'rendezvous':{
                        'startTime':'2015-08-04T01:08:06.8687378Z',
                        'gameSessionRef':'SCID~Template~ID'
                    },
                    'lastGame':{
                        'endTime':'2015-08-04T01:11:28.2767768Z',
                        'result':'win'
                    }
                }
            }
        }
    },
    'properties':{
        'custom':{
            'teamName':'HelloWorldTeam',
            'teamColor':'blue'
        }
    },
    'members':...
}
```

FIG. 7

```
{
    'constants':{
        'system':{
            'arbitration':{
                RULES
            }
            'capabilities':{
                'arbitration':true
            }
        }
    }
    'server':{
        'arbitration':{
            'properties':{
                'system':{
                    RESULTS
                }
            }
        }
    },
    'properties':{
        'custom':{
            'mapName':'Longest',
            'mode':'Team Slayer'
        }
    },
    'members':{
        '1':{
            'constants':{
                'system':{
                    'teamSessionRef':'SCID~Template~ID',
                }
            },
            'properties':{
                'system':{
                    'arbitration':{
                        'result':'win'
                    }
                }
            }
        }
    }
}
```

FIG. 8

UNIFIED PLATFORM FOR A PLURALITY OF TITLES AND GAMING DEVICES

BACKGROUND

A multiplayer tournament provides players of a videogame with the ability to compete against other players of the videogame either individually or in a team setting. Publishers of particular game titles contract with tournament organizers to have tournaments hosted for the particular game title. Typically, to set up a multiplayer tournament, a tournament organizer works directly with a developer per tournament for each game title and per device type to create the multiplayer tournament. The tournament organizer provides the developer with parameters for the specific multiplayer tournament, including the type of gaming device for the tournament, the geographic designations to be supported, maximum number of teams, maximum number of players per team, number of stages within the multiplayer tournament, and these parameters are coded for the specific tournament. After the multiplayer tournament is created, the tournament organizer tracks the progress of players or teams of players through the multiplayer tournament, and determines a winner at the conclusion of the multiplayer tournament. The existing procedure of organizing and hosting multiplayer tournaments is costly and inefficient, which curtails the number of tournaments that can be held as well as the number of titles for which tournaments are held.

SUMMARY

This disclosure describes a unified platform for a plurality of titles and gaming devices, ("unified platform"). The unified platform can provide a software development kit (SDK) that includes application programming interfaces (APIs) for creating multiplayer tournaments for a variety of diverse gaming devices and titles. Publishers and/or developers can use the SDK to define tournament definitions for a plurality of titles and/or to define one or more permission levels for tournament organizers with regard to the titles. A tournament definition can specify configuration values that the platform uses as parameters when creating tournament instances for multiplayer tournaments. The permission levels can define which tournament organizers are able to create tournament definitions and/or view tournament instances for respective titles. In some examples, the permission levels define parameters to which tournament organizers must adhere when creating the tournament definitions for the respective titles.

In some examples, the unified platform stores one or more tournament definitions that are created by game publishers, game developers, and/or tournament organizers for the title. The unified platform can use the stored tournament definitions to create instances of tournaments for the titles. In some examples, the unified platform can use one or more APIs to provide (e.g., expose) created tournament instances to players of the title. In some examples, the platform can further allow players to register for one or more of the created tournament instances via the one or more APIs. Additionally, in some examples, the unified platform can use one or more APIs to track the progress of players and/or teams during tournament instances, advance players through the tournament instances, and provide game publishers, game developers, tournament organizers, spectators, and/or players with updates corresponding to the progress of tournaments.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 5 illustrates an example schema for a tournament definition.

FIG. 6 illustrates an example schema for a tournament instance.

FIG. 7 illustrates an example schema for a team session.

FIG. 8 illustrates an example schema for a match session.

DETAILED DESCRIPTION

Overview

Figure 1:
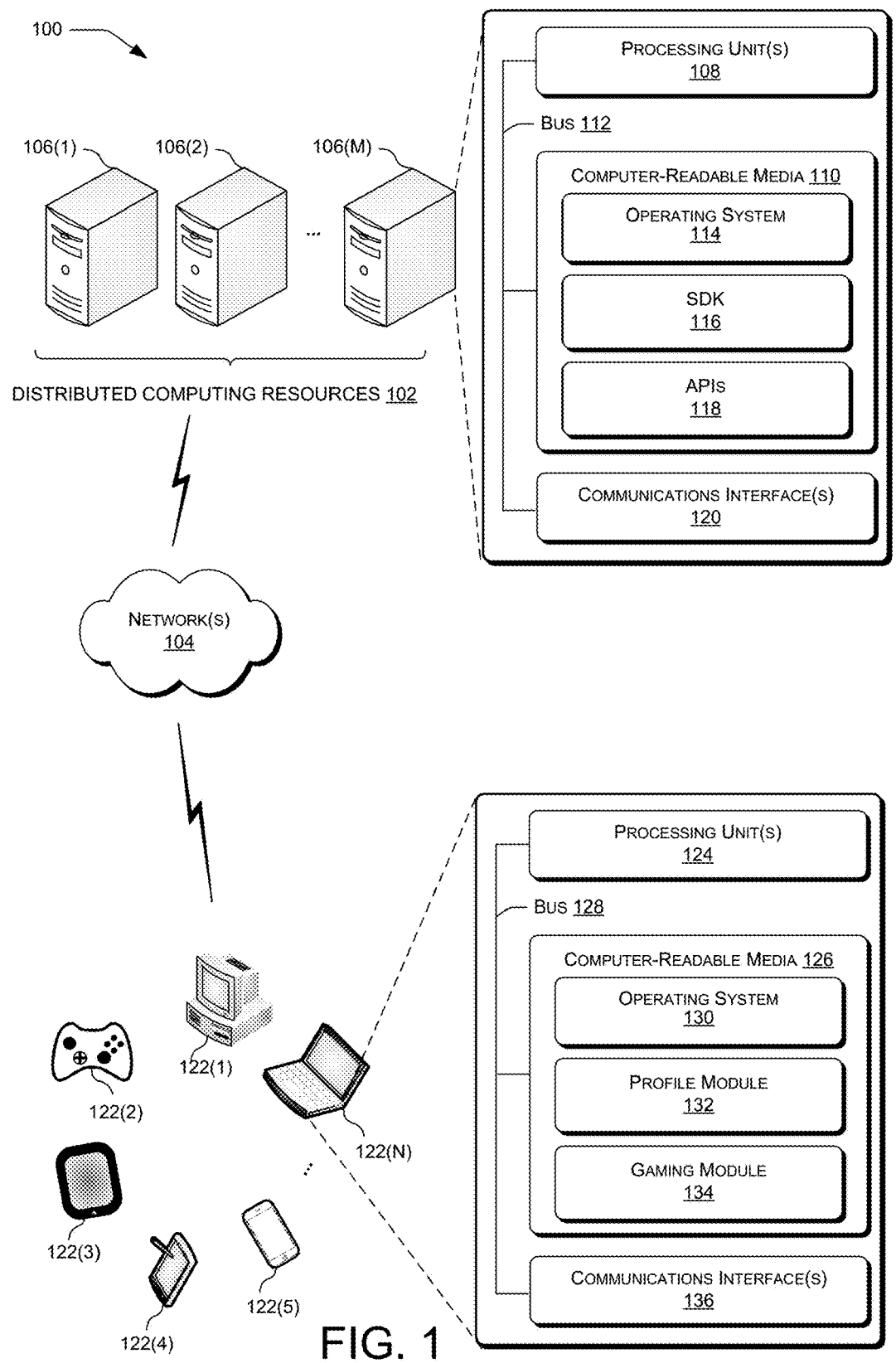
FIG. 1 is a block diagram illustrating an example environment in which a unified platform for a plurality of titles and gaming devices can operate.

Examples described herein provide a unified platform for a plurality of titles and gaming devices ("unified platform"). In some examples, the unified platform can provide tournament organizers, game publishers, and/or game developers with a software development kit (SDK). As used herein an SDK represents a discrete software package that a game publisher and/or game developer uses to create software that works on the gaming platforms that the SDK targets. The SDK can include one or more application programming interface (APIs) for creating tournament definitions for a plurality of titles and/or defining permission levels for a variety of tournament organizers. For instance, a game publisher and/or game developer of a title can use the SDK to create a tournament definition for the title. The tournament definition can specify configuration values that the platform can use as parameters when creating tournament instances for multiplayer tournaments. The unified platform can receive a first tournament definition for the title from the first publisher and a second tournament definition for the title from the second publisher according to instructions contained within the SDK. The game publishers and/or game developers can further use the SDK to define permission levels for various tournament organizers. The permission levels for tournament organizers can define for which title(s) respective tournament organizers are authorized to create tournament definitions and/or limits on the number and types of tournaments for which the tournament organizers are authorized. In some examples, the permission levels can define parameters to which tournament organizers must adhere when creating the tournament definitions for the title(s).

In some examples, based on the permission levels, the platform provides one or more tournament organizers with available tournament instances for the title via an API. For instance, the platform can use the API to determine available tournament instances for the title, and expose the available tournament instances to the one or more tournament organizers based on the permission levels. Additionally or alternatively, in some examples, the platform further provides one or more of the tournament organizers with an API for defining tournament definitions for the title. As discussed above, a tournament definition can specify configuration values that the platform uses as parameters when creating tournament instances for multiplayer tournaments. As such, a tournament organizer can use the API to define a tournament definition, which the platform can receive from the tournament organizer via the API.

In some examples, the platform can store received tournament definitions for a title. The platform can then use the tournament definitions to create tournament instances for the title. In some examples, a tournament instance can represent a tournament of a particular tournament definition, which may be reused for additional tournament instances. For example, the platform can create a tournament instance based on the configuration values as defined by a tournament definition. The configuration values can include a time at which the platform is to activate the tournament instance, a maximum number of teams for the tournament instance, a maximum number of players for each team, a number of stages in the tournament instance, etc.

In some examples, the platform can use one or more APIs to provide available tournament instances to players of the title. For instance, when a player is searching for a multiplayer tournament for which to register with regard to a specific title, the platform can provide the player with a graphical user interface that includes a list of tournament instances associated with the title. The platform can further provide details corresponding to the tournament instances via the graphical user interface. In some examples, the player can use the graphical user interface to select a tournament instance for registration as a spectator, as a participant, or as part of a team. In some instances, a player activating a title and/or navigating to a location within a title can reveal available tournaments for the title.

In some examples, the platform includes one or more APIs for providing updates associated with the tournament instances during the course of tournament play. For instance, the platform can track a progress of individual players and/or teams of players through a tournament instance, and use the progress to advance or eliminate players and/or teams of players during the tournament instance. The platform can then use the one or more APIs to provide the progress of the players and/or teams of players to the game publishers, game developers, tournament organizers, spectators, teams and/or players of the tournament instance.

The unified platform frees tournament organizers, game publishers and/or game developers from generating code for each multiplayer tournament. Rather, various tournament organizers, game publishers and/or game developers can utilize the APIs provided by the SDK of the unified platform to create a variety of multiplayer tournaments for a variety of titles. This saves computing and/or network resources of the tournament organizers, game publishers and/or game developers.

Various examples, scenarios, and aspects are described below with reference to FIGS. 1-13.

Illustrative Environment

FIG. 1 shows an example environment 100 in which a unified platform for a plurality of titles and gaming devices as described herein can operate. In some examples, the various devices and/or components of environment 100 include distributed computing resources 102 that can communicate with one another and with external devices via one or more networks 104.

Network(s) 104 can include, for example, public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resources 102 include devices 106(1)-106(M). Examples support scenarios where device(s) 106 can include one or more computing devices that operate in a cluster or other grouped configuration to share resources, balance load, increase performance, provide fail-over support or redundancy, or for other purposes. In various examples, device(s) 106 can belong to a variety of categories or classes of devices such as traditional server-type devices, desktop computer-type devices, mobile-type devices, special purpose-type devices, embedded-type devices, and/or wearable-type devices. Thus, although illustrated as a single type of device—a server-type device—device(s) 106 can include a diverse variety of device types and are not limited to a particular type of device. Device(s) 106 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, Internet of Things (IoT) devices, work stations, media players, personal video recorders (PVRs), set-top boxes, cameras, integrated components (e.g., peripheral devices) for inclusion in a computing device, appliances, or any other sort of computing device.

Device(s) 106 can include any computing device having one or more processing unit(s) 108 operably connected to computer-readable media 110 such as via a bus 112, which in some instances can include one or more of a system bus, a data bus, an address bus, a PCI bus, a Mini-PCI bus, and/or any variety of local, peripheral, and/or independent buses. Executable instructions stored on computer-readable media 110 can include, for example, an operating system 114, software development kit (SDK) 116, application programming interfaces (APIs) 118, and other modules, programs, or applications that are loadable and executable by processing units(s) 108. Alternatively, or in addition, the functionally described herein can be performed, at least in part, by one or more hardware logic components such as accelerators. For example, and without limitation, illustrative types of hardware logic components can include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU embedded in an FPGA fabric.

Device(s) 106 can also include one or more communication interface(s) 120 to enable communications between computing device(s) 106 and other networked devices such as client computing device(s) 122. Such communication interface(s) 120 can include one or more network interface controllers (NICs) or other types of transceiver devices to send and receive communications over a network. For simplicity, other components are omitted from the illustrated device(s) 106.

Other devices configured to implement the unified platform for a plurality of titles and gaming devices can include client computing device(s) 122, for example one or more of devices 122(1)-122(N). Client computing device(s) 122 can belong to a variety of categories or classes of devices, which can be the same as, or different from, device(s) 106, such as traditional client-type devices, desktop computer-type devices, mobile-type devices, special purpose-type devices, embedded-type devices, and/or wearable-type devices. Client computing device(s) 122 can include, but are not limited to, a personal computer 122(1), game consoles and/or gaming devices 122(2), a tablet computer 122(3), a personal data assistant (PDA) 122(4), a mobile phone/tablet hybrid 122 (5), a laptop computer 122(N), telecommunication devices, computer navigation type client computing devices such as satellite-based navigation systems including global positioning system (GPS) devices and other satellite-based navigation system devices, other mobile computers, wearable computers, implanted computing devices, desktop computers, automotive computers, network-enabled televisions, thin clients, terminals, Internet of Things (IoT) devices, work stations, media players, personal video recorders (PVRs), set-top boxes, cameras, integrated components (e.g., peripheral devices) for inclusion in a computing device, appliances, or any other sort of computing device.

Client computing device(s) 122 of the various categories or classes and device types, such as the illustrated laptop computer 122(N), can represent any type of computing device having one or more processing unit(s) 124 operably connected to computer-readable media 126 such as via a bus 128, which in some instances can include one or more of a system bus, a data bus, an address bus, a PCI bus, a Mini-PCI bus, and any variety of local, peripheral, and/or independent buses.

Executable instructions stored on computer-readable media 126 can include, for example, an operating system 130, a profile module 132, a gaming module 134, and other modules, programs, or applications that are loadable and executable by processing units(s) 122.

Client computing device(s) 122 can also include one or more network interfaces 136 to enable communications between client computing device(s) 122 and other networked devices, such as other client computing device(s) 122 or device(s) 106 over network(s) 104. Such network interface(s) 136 can include one or more network interface controllers (NICs) or other types of transceiver devices to send and receive communications over a network.

In the example of FIG. 1, the device(s) 122 can obtain APIs 118 exposed by SDK 116 from a unified platform for a plurality of titles and gaming devices such as from devices 106 of distributed computing resources 102 provide one or more publishers or developers of a title with a SDK 116. In some examples, the SDK 116 can include one or more APIs 118 for creating tournament definitions for the title and/or defining permission levels for tournament organizers. For instance, game publisher and/or game developer of a title may use the SDK 116 to define a tournament definition for the title. The tournament definition can specify configuration values that the device(s) 106 use as parameters when creating tournament instances for multiplayer tournaments. The game publisher and/or game developer can further use the SDK 116 to define permission levels for tournament organizers. The permission levels for tournament organizers define which tournament organizers are able to create tournament definitions and/or view tournament instances for the title. In some examples, the permission levels further define parameters that tournament organizers must follow when creating the tournaments for particular titles.

In the example of FIG. 1, the device(s) 106 can further provide one or more tournament organizers with available tournament instances for the title via an API 118. For instance, the device(s) 106 can use an API 118 to determine available tournament instances for the title, and expose the available tournament instances to the one or more tournament organizers. Additionally or alternatively, in some examples, the device(s) 106 can provide one or more of the tournament organizers with an API 118 for setting up a tournament for the title. As discussed above, a tournament definition can specify configuration values that the device(s) 106 use as parameters when creating tournament instances for multiplayer tournaments. As such, a tournament organizer can use the API 118 to set up a tournament, which the device(s) 106 can receive from the tournament organizer via the API 118.

Additionally, in the example environment 100 of FIG. 1, the computing device(s) 122 can use the gaming module 134 to connect with the device(s) 106 in order to participate in one or more multiplayer tournaments for one or more titles. For instance, a player can utilize the computing device 122 to access a game title. When executing the game title, the player can select a multiplayer mode, which can cause the computing device 122 to connect with device(s) 106 over the network 104. The player can then use the computing device 122 to view authorized multiplayer tournaments for the game title, register as a spectator, a player, and/or a member of a team with one or more authorized multiplayer tournaments, view and/or play in the one or more authorized multiplayer tournaments, and receive updates and/or results for the one or more multiplayer tournaments.

In some examples, the computing device(s) 122 can use the profile module 132 to generate player profiles for different players, and provide the device(s) 106 with the player profiles. A player profile can include one or more of a name of player, a skill level of the player, a rating for the player, an age of the player, a friends list for the player, a location of the player, etc. The device(s) 106 can use to player profiles when registering players for multiplayer tournaments. For instance, the device(s) 106 can use player profiles to determine whether players meet required registration parameters for particular multiplayer tournaments.

Figure 2:
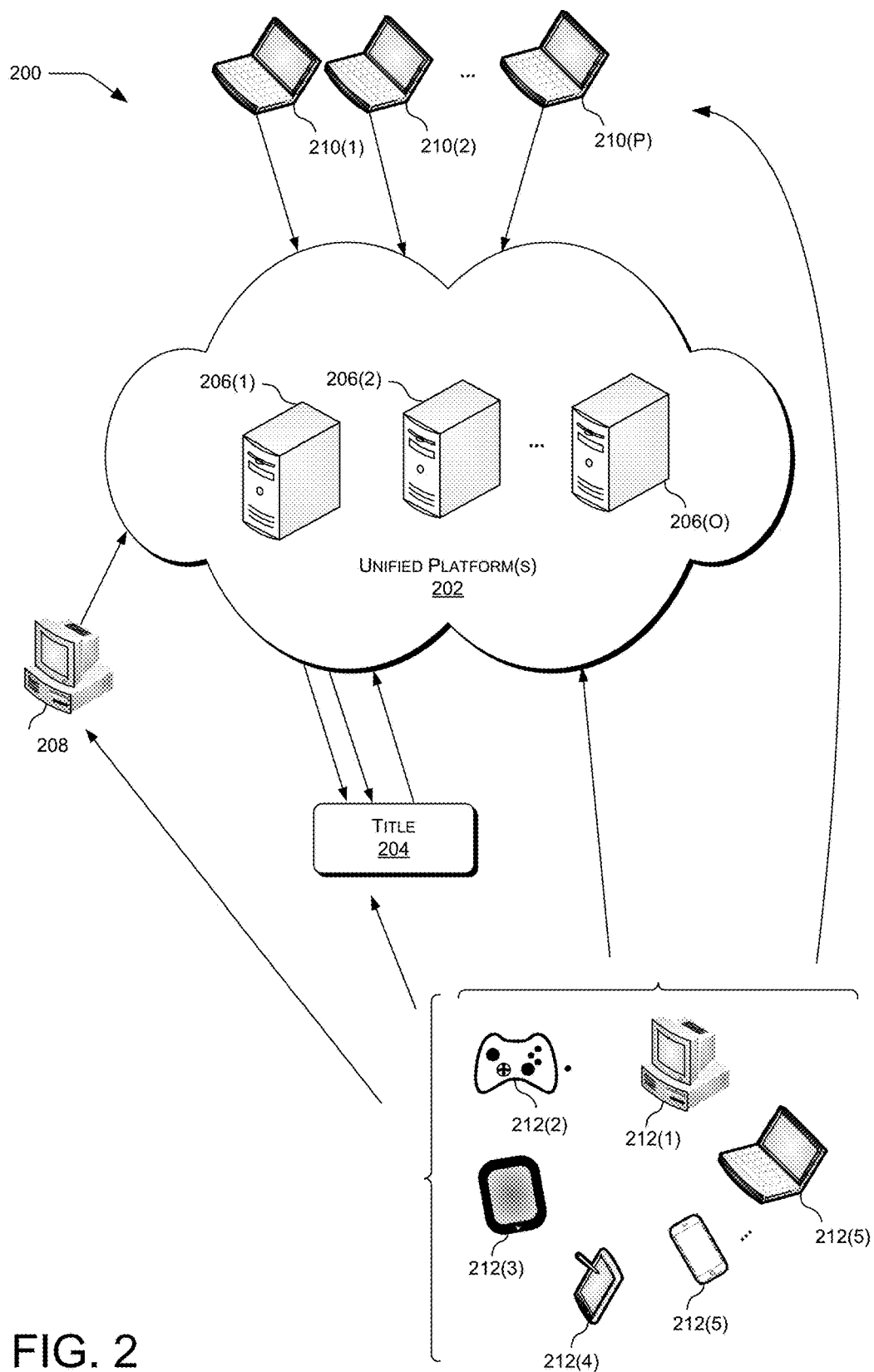
FIG. 2 is a block diagram illustrating an example scenario including a unified platform for a plurality of titles and gaming devices.

FIG. 2 is a block diagram illustrating an example scenario 200 in which a cloud-based multiplayer platform such as unified platform 202 can unify a multiplayer gaming experience for a plurality of title(s) 204 and a plurality of gaming devices. Unified platform(s) 202, which includes device(s) 206(1)-206(0) can represent the distributed computing resources 102 includes device(s) 106(1)-106(M), can unify the multiplayer gaming environment 200 between game developer(s), game publisher(s) 208, tournament organizer(s) 210(1)-210(P), and computing device(s) 212(1)-212(Q) (which may represent computing device(s) 122(1)-122(N)).

For instance, the device(s) 206 can provide a game publisher(s) and/or game developer(s) 208 with an SDK, such as SDK 116 from FIG. 1. The game publisher(s) and/or game developer(s) 208 can include game publisher(s) and/or game developer(s) of the title(s) 204. In some examples, the SDK can include one or more APIs, such as one or more APIs 118, for creating tournament definitions for the title(s) 204 and/or to define permission levels for tournament organizers 210. For instance, the game publisher(s) and/or game developer(s) 208 of the title 204 can use the SDK to define a tournament definition for a plurality of titles 204. The tournament definition can specify configuration values that the device(s) 206 use as parameters when creating tournament instances for multiplayer tournaments. In various examples, the game publisher(s) and/or game developer(s) 208 can use the SDK to define different permission levels for individual tournament organizers 210. The permission levels for tournament organizers 210 define which tournament organizers 210 are able to set up and/or manage various tournament instances for the titles 204. In some examples, the permission levels further define parameters that tournament organizers 210 must follow when setting up tournament(s), managing tournament(s), and/or creating the tournament definitions for particular title(s) 204.

In some examples, the device(s) 206 can expose an API to the tournament organizers 210 can access and/or bid on opportunities to manage available tournament instances for title(s) 204 via an API, such as APIs 118. For instance, the device(s) 206 can use an API to determine available tournament instances for the title 204, and expose (e.g., publish) the available tournament instances to one or more of the tournament organizers 210 using the API. In some examples, the device(s) 206 expose the available tournament instances to the tournament organizers 210 based on the permission levels as defined by the game publisher(s) and/or game developer(s) 208. For instance, the device(s) 206 can expose available tournament instances to a first tournament organizer 210(1), while not exposing the available tournament instances to a second tournament organizer 210(2).

In some examples, the device(s) 206 can provide one or more of the tournament organizers 210 with an API, (such as one or more APIs 118, to set up tournaments for the title(s) 204. As discussed above, a tournament definition can specify configuration values that the device(s) 206 use as parameters when creating tournament instances for multiplayer tournaments. As such, a tournament organizer 210 can use an API to set up a tournament according to a tournament definition, which the device(s) 206 can receive from the tournament organizer via the API. In some examples, the device(s) 206 provide the tournament organizers 210 with the SDK for creating tournament instances based on the permission levels as defined by the game publisher(s) and/or game developer(s) 208. For instance, the device(s) 206 can expose the API to a first tournament organizer 210(1), while not exposing the API to a second tournament organizer 210(2).

In the example of FIG. 2, device(s) 206 can communicate with computing device(s) 212. For instance, the device(s) 206 can utilize one or more APIs (such as one or more APIs 118) to query the title 204 for authorized tournament instances. In response, the title 204 can provide the device(s) 206 with authorized tournament instances for the title 204. The device(s) 206 can then provide the computing device(s) 212 with the authorized tournament instances for the title 204. In some examples, the computing device(s) 212 can select and register with one or more of the authorized tournament instances via the one or more APIs. The device(s) 206 can then store data corresponding to registrations of tournament instances of the title 204 that the device(s) 206 receive from the computing device(s) 212.

In some examples, device(s) 206 provide authorized tournament instances for a plurality of titles to computing device(s) 212 based on one or more parameters of tournament instances. For instance, a tournament instance can include parameters such as one or more of an age of player, a location of a player, a skill level of a player, etc. that can represent a threshold for registering for the tournament instance. As such, the device(s) 206 may determine for which tournament instances a given player profile is qualified to register based on the profile meeting one or more particular parameters of the tournament instance. The device(s) 206 can then provide a computing device 212 associated with the player with tournament instances for which the player is authorized to register.

Additionally or alternatively, in some examples, the computing device(s) 212 can register for tournament instances of particular titles 204 with the game publisher(s) and/or game developer(s) 208, and/or with the tournament organizer(s) 210. For example, a game publisher(s) and/or game developer(s) 208 can provide the computing device(s) 212 with tournament instances that the game publisher(s) and/or game developer(s) 208 create. The game publisher(s) and/or game developer(s) 208 can then receive data corresponding to registrations of one or more of the tournaments instances from the computing device(s) 212. In some examples, the game publisher(s) and/or game developer(s) 208 can communicate with device(s) 206 in order to notify the device(s) 206 about the registrations.

As a further example, the tournament organizers 210 can provide the computing device(s) 212 with tournament instances that the tournament organizer(s) 210 have set up and/or are managing. The tournament organizers(s) 210 can then receive data corresponding to registrations for one or more tournament instances from the computing device(s)

212, and notify the device(s) 206 about the registrations. Additionally or alternatively, in some examples, the computing device(s) 212 can register for tournament instances through the title 204 using a similar process as the computing device(s) 212 use to register for tournament instances with the game publisher(s) and/or game developer(s) 208 and the tournament organizer(s) 210.

In some examples, the device(s) 206 communicate with computing device(s) 212 in order to provide the computing device(s) 212 with multiplayer tournaments. For instance, the device(s) 206 can activate a tournament instance corresponding to a multiplayer tournament. The device(s) 206 can then connect with computing device(s) 212 that registered for the tournament instance in order to provide players with access to participate in the multiplayer tournament. In some examples, the device(s) 206 can allow different platforms of computing device(s) 212 to participate in a multiplayer tournament for the title 204. For example, the device(s) 206 can provide both the personal computer 212(1) and the gaming device 212(2) with a unified multiplayer tournament for the title 204. In various examples, device(s) 206 can provide a first tournament for the title to personal computers 212(1) and a second tournament for the title to gaming device(s) 212(2), etc. In some examples, device(s) 206 can provide a single multiplayer tournament for the title 204 to multiple types of devices 212 such as to personal computer 212(1) and gaming device(s) 212(2), etc.

The unified platform(s) 202 can provide the features above for a plurality of titles 204. For instance, the device(s) 206 can provide multiple game publisher(s) and/or game developer(s) 208 with one or more SDKs that the game publisher(s) and/or game developer(s) 208 can use to develop tournaments for more than one title 204. Additionally, the device(s) 206 can provide tournament organizers 210 with multiple APIs for setting up and/or managing tournament instances for more than one title 204. As such, in some examples, the unified platform(s) 202 can provide a unified platform for multiplayer tournaments to a plurality of game publisher(s) and/or game developer(s) 208, tournament organizers 210, and computing device(s) 212, and/or can provide a unified platform for creating multiplayer tournaments for any number of titles.

Figure 3:
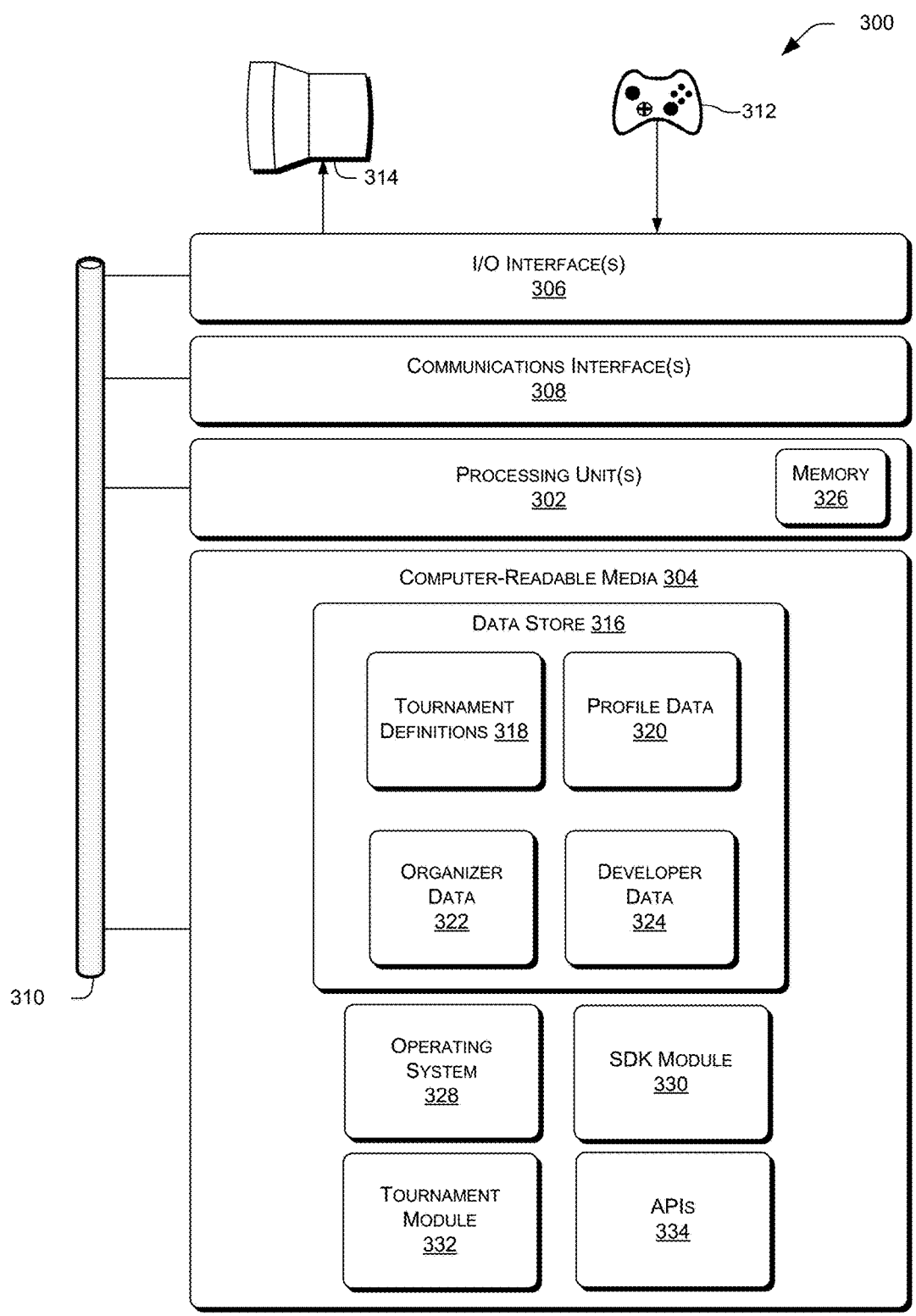
FIG. 3 is a block diagram illustrating an example computing device configured to provide a unified platform for a plurality of titles and gaming devices.

FIG. 3 is a block diagram illustrating an example computing device configured to provide a unified platform for a plurality of titles and gaming devices. Computing device 300 can represent device(s) 106 and/or device(s) 206. Example computing device 300 includes one or more processing unit(s) 302, computer-readable media 304, input/output interface(s) 306, and communication interface(s) 308. The components of computing device 300 are operatively connected, for example, via a bus 310, which can represent bus 112.

In example computing device 300, processing unit(s) 302 can correspond to processing unit(s) 108, and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Computer-readable media 304 can correspond to computer-readable media 110, and can store instructions executable by the processing unit(s) 302. Computer-readable media 304 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in computing device 300, while in some examples one or more of a CPU, GPU, and/or accelerator is external to computing device 300.

Computer-readable media 304 can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Input/output (I/O) interfaces 306 allow computing device 300 to communicate with input/output devices such as user input devices including peripheral input devices (e.g., a game controller 312, a keyboard, a mouse, a pen, a voice input device, a touch input device, a gestural input device, and the like) and/or output devices including peripheral output devices (e.g., a display 314, a printer, audio speakers, a haptic output device, and the like).

Communication interface(s) 308, which may correspond to communication interface(s) 120, can represent, for example, network interface controllers (NICs) or other types of transceiver devices to send and receive communications over a network.

In the illustrated example, computer-readable media 304 includes a data store 316. In some examples, data store 316 includes data storage such as a database, data warehouse, or other type of structured or unstructured data storage. In some examples, data store 316 includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example.

Data store 316 can store data for the operations of processes, applications, components, and/or modules stored in computer-readable media 304 and/or executed by processing unit(s) 302 and/or accelerator(s). For instance, in some examples, data store 316 can store tournament definitions 318, profile data 320, organizer data 322, and developer data 324. Alternately, some or all of the above-referenced data can be stored on separate memories 326 on board one or more processing unit(s) 302 such as a memory on board a CPU-type processor, a GPU-type processor, an FPGA-type accelerator, a DSP-type accelerator, and/or another accelerator.

In the illustrated example of FIG. 3, computer-readable media 304 also includes operating system 328, which can represent operating system 114. Additionally, computer-readable media 304 includes one or more modules, which are illustrated as blocks 330, 332, and 334, although this is just an example, and the number can vary higher or lower. Functionality described associated with blocks 330, 332, and/or 334 can be combined to be performed by a fewer number of modules or it can be split and performed by a larger number of modules.

Software development kit (SDK) module 330 includes logic to program processing unit(s) 302 of computing device 300 to generate SDKs for game developers and/or game publishers. In some examples, the computing device 300 can use the SDK module 330 to generate an SDK for each title according to requirements game publishers and/or game developers, tournament organizer(s), and/or title(s) provide to the computing device 300. As used herein a title can include any type of game that can be executed by computing devices in order to allow players to play in multiplayer tournaments. For instance, a title can include a first person game, an action game, a role playing game, a strategy game, a racing game, or the like. In some examples, the game publishers and/or game developers provide the titles to the computing device 300.

An SDK can expose one or more application programming interface (APIs) 334 for creating tournament definitions 318 for the title. For instance, a game publisher and/or game developer of a title can use the SDK to create a tournament definition 318 for a new or existing title. The tournament definition 318 can specify configuration values that the computing device 300 can use as parameters when creating tournament instances for multiplayer tournaments. In some examples, and as illustrated in FIG. 3, the computing device 300 can store the tournament definitions 318 for a plurality of titles in data store(s) 316.

The SDK can expose one or more APIs 334 for defining permission levels for tournament organizers. For instance, a game publisher and/or game developer can utilize an SDK to define permission levels for tournament organizers with regard to the title. The permission levels for tournament organizers can define which tournament organizers are able to set up tournaments for respective titles and/or which tournament organizers can manage authorized tournament instances for the respective titles. In some examples, the permission levels define parameters that the tournament organizers must follow when setting up and/or managing tournament instances 318 for respective titles.

For instance, a game publisher and/or game developer can download an SDK and use the APIs exposed by the SDK to define permission levels for tournament organizers that allow some tournament organizers to set up and/or manage tournaments 318 for particular titles. Based on the permission levels, the computing device 300 can provide a first of the plurality of tournament organizers with one or more APIs 334 specifically for setting up a tournament for the title and/or a second of the plurality of tournament organizers with APIs 334 specifically for managing an already created tournament, and/or provide the first of the plurality of tournament organizers with APIs 334 to both set up and manage tournaments for the title. The computing device 300 can receive criteria for tournaments consistent with tournament definitions 318 from the tournament organizer via the one or more APIs 334, and store the tournament criteria in the data store 316.

In some examples, a game publisher and/or game developer can use exposed APIs to update tournament definitions after providing the computing device 300 with the tournament definition. In such examples, the computing device 300 can incorporate the updated tournament definitions into the API a tournament organizer can use to set up and/or manage a tournament for a respective title. For instance, the computing device 300 may provide a game publisher and/or game developer with one or more APIs 334 for updating tournament definitions. The game publisher and/or game developer may want to raise the level of tournament play and/or open a tournament for different devices and can provide an updated tournament definition with higher experience threshold and/or different device parameters to computing device 300. The computing device 300 can then receive updated tournament definitions from the game publisher and/or game developer via the one or more APIs 334. The computing device 300 can incorporate the updated tournament definitions into the APIs 334 that the computing device 300 previously exposed to tournament organizers to use to set up and/or manage tournaments for respective titles.

Tournament module 330 includes logic to program processing unit(s) 302 of computing device 300 to generate tournament instances using the tournament definitions 318, provide game publishers, game developers, tournament organizers, and/or prospective players and/or spectators with information on the generated tournament instances, and host multiplayer tournaments based on the generated tournament instances. For instance, the computing device 300 can utilize the tournament module 330 to generate a tournament instance based on a tournament definition 318. As discussed above, a tournament instance can include a complete tournament according to a particular tournament definition 318. For instance, the computing device 300 can create a tournament instance based on the configuration values as defined by a tournament definition 318.

The configuration values can include (1) a name or description; (2) organizer information; (3) registration configuration, including length of the registration period and minimum/maximum team count; (4) team requirements, such as a session template for multiplayer session directory (MPSD) and/or minimum/maximum number of participants; (5) configuration settings for each stage of the tournament instance, such as minimum duration of each stage, progress style (e.g., Swiss, round robin, single elimination, double elimination, etc.), configuration for game rounds (e.g., minimum duration per round, whether multiple rounds run in parallel, game start tolerance period and default action, etc.); (6) instance scheduling information, such as a list of instance start times, configuration overrides, and one or more recurrence operations; and/or (7) localization of strings. In some examples, the game publisher, game developer, and/or tournament organizer can modify configuration values before opening the registration. Additionally or alternatively, in some examples, the game publisher, game developer, and/or tournament organizer can modify configuration values during the registration period for the multiplayer tournament that is associated with the tournament instance and/or during the progress of the multiplayer tournament. In some examples, the ability to modify configuration values during tournament registration and/or play can be limited to particular of the game publisher, game developer, and/or tournament organizer.

The computing device 300 can further utilize the tournament module 330 to provide game publishers, game developers, tournament organizers, teams, players, and/or spectators with authorized tournament instances. For instance, the tournament module 330 can use one or more APIs 334 to collect data about authorized tournament instances. In various examples, the one or more APIs 334 retrieve the data from a local storage, such as the data store 116. In some examples, the one or more APIs 334 communicate with the title based on previous play and/or tournaments to collect the data. For instance, the one or more APIs 334 can cause a request to be sent to the title for previous tournament results. The computing device 300 can then receive the data and determine authorized tournament instances for the title. For example, based on a previous well-received tournament, a tournament organizer can be authorized to set up and/or manage a higher value tournament. As another example, based on previous tournament results a player can be authorized to register for a higher value tournament. Correspondingly, tournaments for which the unified gaming platform received negative feedback and/or players who did not perform well and/or who were determined to have been cheating in a previous tournament can cause computing device 300 to decrease authorization for the tournament organizer and/or player. The unified platform can lower permission levels and/or communicate a recommendation to lower permission levels to the game publishers and/or game developers who can provide a lower permission level via an updated tournament definition.

In some examples, after collecting the data, the tournament module 330 can use one or more APIs 334 to provide the data to the game publishers, game developers, tournament organizers, and/or the players. For instance, the computing device 300 can generate a user interface that includes a list of authorized tournament instances. The computing device 330 can then provide a respective user interface for presentation on devices associated with the game publishers, game developers, tournament organizers, players, and/or spectators. In some examples, the computing device 300 provides the user interface to the tournament organizers based on their respective permission levels. For instance, the computing device 300 may provide a user interface to tournament organizers that are authorized to view the tournament instances while refraining from providing the user interface to tournament organizers that are not authorized to view the tournament instances.

In some examples, the computing device 300 can generate the list of authorized tournament instances based on the configuration settings of the authorized tournament instances. For instance, the configuration settings for a tournament instance can specify a location, an age level, a skill level, or the like for players in order for a player to register for the tournament instance. As such, the computing device 300 can generate a list of authorized tournament instances for a player based on the configuration settings. In some examples, the computing device 300 uses the profile data 320 to determine whether a player meets the configuration settings. For instance, the profile data 320 can include data about respective players, such as an age, location, skill level, username, friends list, or the like. As such, the computing device 300 can use the profile data 320 about a player to determine for which tournament instances the player is qualified to register.

The computing device 300 can further utilize the tournament module 332 to host multiplayer tournaments based on the generated tournament instances. For instance, the computing device 300 can use one or more APIs 334 to monitor a multiplayer tournament during progression through tournament play. While monitoring the multiplayer tournament, the computing device 300 can track the progress of players and/or teams of players through the multiplayer tournament, record scores for players and/or teams of players at each stage, perform arbitration to determine which players and/or teams of players win at each stage of the multiplayer tournament, advance or eliminate players and/or teams of players from the multiplayer tournament, etc.

In some examples, the computing device 300 can further use one or more APIs 334 to provide multiplayer tournament updates to game publishers, game developers, tournament organizers, players, and/or spectators. For instance, the computing device 300 can use one or more APIs 334 to collect data corresponding to one or more multiplayer tournaments that are currently in progress. The computing device 300 can then utilize the one or more APIs 334 to provide the data to a game publisher, game developer, tournament organizer, and/or player. In some examples, to provide the data, the computing device 300 generates a user interface that includes the data. The computing device 300 then provides the user interface to the game publisher, game developer, tournament organizer, and/or players. In some examples, the user interface can include data corresponding to more than one multiplayer tournament. For instance, the computing device 300 can provide a tournament organizer with data corresponding to each tournament instance currently in progress that the tournament organizer manages.

Also illustrated in FIG. 3, the computing device 300 stores organizer data 322. Organizer data 322 can include data corresponding to each of the tournament organizers that communicate with the computing device 300 to set up and/or manage tournament instances. For instance, the organizer data 322 can include data about each of the tournament organizers 210 from FIG. 2. In some examples, the data can include a name of the tournament organizer, a location for the tournament organizer, titles that the tournament organizer creates tournament definitions and/or tournament instances for, or the like. Additionally or alternatively, the data can include permission levels for the tournament organizer that are based on SDKs the computing device 300 receives from game publishers and/or game developers. For instance, the data can indicate that a tournament organizer can create tournament instances for a first title, but not create tournament instances for a second title.

The computing device 300 can store developer data 324. Developer data 324 can include data corresponding to individual game publishers and/or game developers of the plurality of game publishers and game developers. For instance, the developer data 324 can include data about individual of the game publisher(s) and/or game developer(s) 208 from FIG. 2. In some examples, the developer data 324 can include a name of the game publisher and/or game developer, a location of the game publisher and/or game developer, one or more titles created by the game publisher and/or game developer, SDKs requested by the game publisher and/or game developer, and/or tournament definitions created by the game publisher and/or game developer, etc.

Figure 4:
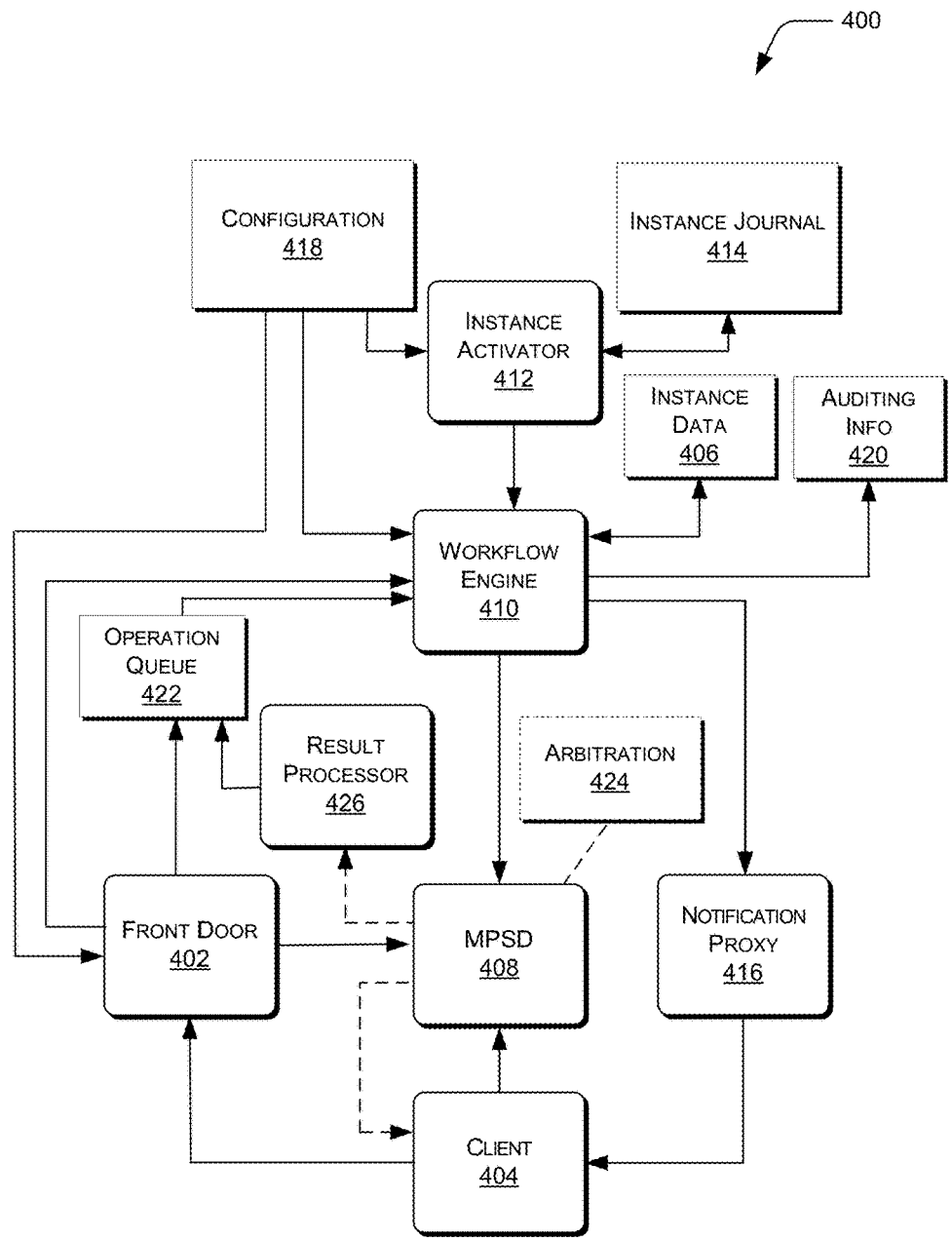
FIG. 4 is a block diagram illustrating an example service architecture of a unified platform for a plurality of titles and gaming devices.

FIG. 4 is a block diagram illustrating an example service architecture 400 of a unified platform for a plurality of titles and gaming devices. The service architecture 400 can be implemented by the distributed computing resources 102, the unified platform(s) 202, and/or the computing device(s) 300, 206, 106. In some examples, the service architecture 400 includes multiple entities 402-426 for implementing tournament services.

For instance, in some examples, the service architecture 400 can include a front door 402. The front door 402 can host some portion and/or all multiplayer tournaments that are accessible by clients 404 via APIs such as APIs 334. Client 404 can include game publishers, game developers, tournament organizers, players and/or spectators. In some examples, the front door 402 exposes public endpoints to client 404. In such examples, the front door 402 is responsible for implementing standard checks against common dependencies. For instance, the front door 402 can be responsible for implanting standard checks against authorizations, MXAZ video upload, localization of results, or the like.

The front door 402 can further act as a soft cache of information stored in the instance data 406 for operations that require reading information from a given tournament instance. In some examples, for tournament instances that have completed, data cached in the front door 402 will have a long expiration timeout, as the value of the data will change relatively infrequently. In some examples, for tournament instances that are still active, the data cached in the front door 402 will have a short expiration period, as the value of that data can change frequently.

In some examples, the front door 402 can provide APIs to operations that require complex or multiple roundtrips to other services, like MPSD 408. For instance, the front door 402 can retrieve all players for a given team that are registered against an active tournament instance for a given title.

The workflow engine 410 can advance a state machine for every active tournament instance. For instance, in some examples, if a tournament instance is active (e.g., in progress), the tournament instance can be loaded on a workflow engine machine. In such examples, the workflow engine 410 can include a soft-state, portioned service. As such, the workflow engine 410 can advance the state of each workflow engine machine as the tournament instances are active. In some examples, the workflow engine 410 may partition tournament instances independently, such that each tournament instance for a title is hosted on a different workflow engine server. In some examples, the workflow engine 410 may not partition a single tournament instance across multiple workflow engine machines.

The workflow engine 410 can further include the master source of truth for tournament instance data. For instance, any operation received from an external service for a tournament instance that is not currently loaded will cause the workflow engine 410 to retrieve the data from the instance data 406 storage backend and cache the data in memory. In some examples, individual read and/or write operations on the instance data 406 storage backend go through the workflow engine 410. In some examples, information for tournament instances that are not currently active will be evicted from the memory after a threshold period of time.

The workflow engine 410 can process multiple operations from a plurality of tournament instances. For instance, the workflow engine 410 can process operations that include registration of new teams into a tournament instance, advancing stages and rounds of a tournament instance, starting and processing results of a game session of a tournament instance, maintaining an auditing log of all scheduled user and/or administrative operations, etc.

The instance advisor 412 can monitor the tournament definitions and/or tournament instances for configuration changes. For instance, the instance advisory 412 can determine whether a game publisher, game developer, and/or tournament organizer changes any of the configuration values for tournament definitions and/or tournament instances. As discussed above, the configuration values can include (1) a name or description; (2) organizer information; (3) a registration configuration, including length of the registration period and minimum/maximum team count; (4) team requirements, such as session template for MPSD 408 and/or minimum/maximum number of participants; (5) configuration settings for each stage of the tournament instance, such as minimum duration of each stage, progress style (e.g., Swiss, round robin, single elimination, double elimination, etc.), configuration for game rounds (e.g., minimum duration per round, whether multiple rounds run in parallel, game start tolerance period and default action, etc.); (6) instance scheduling information, such as a list of instance start times, configuration overrides, and one or more recurrence operations; and (7) localization of strings.

In some examples, the instance activator 412 can add new tournament instances for titles and activate the new tournament instances in the workflow engine 410. For instance, instance activator 412 can traverse the configuration values of tournament definitions and compare the configuration values against information that is stored in the instance journal 414. Based on the comparison, the instance activator 412 can add new tournament instances to the tournament journal 414, remove tournament instances from the tournament journal 414, and/or activate a new tournament instance in the workflow engine 410 when the new tournament instance should begin accepting registrations. Additionally, the instance activator 412 can check that all active tournament instances are loaded in the workflow engine 412. In some examples, the instance activator 412 can periodically check that tournament instances are loaded in the workflow engine 412.

Notification proxy 416 can broadcast messages and notifications (such as alerts) to clients 404. In some examples, the notification proxy 416 broadcasts the messages and notifications based on the occurrence of an event for an active tournament instance. For instance, an event may include that a tournament for which the client 404 is registered being about to start, a game within the tournament for which the client 404 is scheduled being about to start, etc.

Configuration 418 can store the configurations for tournament definitions of titles as defined by game publishers, game developers, and/or tournament organizers. The configuration values (e.g., schema) for a tournament definition can include (1) a name or description; (2) organizer information; (3) registration configuration, including length of the registration period and/or minimum/maximum team count; (4) team requirements, such as session template for MPSD 408 and/or minimum/maximum number of participants; (5) configuration settings for each stage of the tournament instance, such as minimum duration of each stage, progress style (e.g., Swiss, round robin, single elimination, double elimination, etc.), configuration for game rounds (e.g., minimum duration per round, whether multiple rounds run in parallel, game start tolerance period and/or default action, etc.); (6) instance scheduling information, such as a list of instance start times, configuration overrides, and/or one or more recurrence operations; and/or (7) localization of strings.

The instance journal 414 can record tournament instances that are created from a tournament definition. For instance, the instance journal 414 includes information about past, running, and/or future tournament instances for one or more titles. In some examples, the instance activator 412, game publishers, game developers, tournament organizers, and/or players can query the instance journal 414 for past, running, or further tournament instances for a title. In some examples, the storage for the instance journal 414 includes table storage, such as Azure Table storage. In such examples, the schema for the Azure Table may include one or more of SCID and SandboxID (partition key), start time, tournament instance identity, state of the tournament instance, tournament definition, etc.

The instance data 406 can include backend storage that contains some or all of the information relevant for an active tournament instance. The storage can provide persistence to the tournament instance and can represent the latest state of the tournament instance as kept in the memory within the workflow engine 410. For instance, in some examples, every operation that results in a state change to a tournament instance can be written into the instance data 406 by the workflow engine 410. In some examples, only the workflow engine 410 may be allowed to write into the instance data 406.

In some examples, the instance data 406 can store the information for a single tournament instance within a given container. For instance, in a container, the instance data 406 can store multiple blobs that will contain different sections of information associated with the tournament instance. In some examples, the information in each blob is stored in JSON format. In some examples, the separation of blobs is based on the frequency of the write operations at each section during different stages of the tournament instance (e.g., creation, registration, progression). For instance, a list of blobs can include properties, configuration, team, and/or progress for a tournament instance.

Auditing information 420 can provide a historical view of each change operation that is applied (or attempted) for a tournament instance. In various examples the historical view can be accessible by a feature team, the game developer, the game publisher, and/or the tournament organizer for the purpose of real time auditing or debugging progression of a tournament instance. In some examples, the audit information 420 includes blob storage. In such examples, the audit information blob can be stored within a same container as the instance data 406 for a given tournament instance.

Operation queue 422 manages the operations that affect the state of a tournament instance. For instance, in some examples, each operation that affects the state of the tournament instance goes through the operation queue 422. The operation queue 422 ensures that the operations are processed in the order in which the operations are received or scheduled. Additionally, the operation queue 422 ensures that each of the operations will be processed at least once. In some examples, the operations can include one or more of team registration, round result reporting, administrative operations, etc.

In some examples, the backend storage layer for the operation queue 422 can include an Azure Queue associated with an individual tournament instance. In such examples, the format of elements within the operation queue 422 can include JavaScript Object Notation (JSON) encoded messages that support forward compatibility so that new message types can be defined in the future. The use of a background storage layer such as the Azure Queue can provide benefits like scalability, reliability, and/or scheduling.

Arbitration 424 can determine winners and/or losers of games during progression of a tournament. For instance, at the end of each game (described below), one or more clients 404 can transmit the results of the game. The MPSD 408 can then use arbitration 424 to determine a final result for the game based on the results received from the clients 404 and/or data about the clients 404. In some examples, the MPSD 408 can determine the final result based on a most common written result from the client 404 when all of the results received do not match. In some examples, the MPSD 408 can determine the final result based on an average of the results received from the client 404 when all of the results received do not match.

The MPSD 408 can use a result processor 426 to notify the operation queue 422 of the final results. In some examples, the final results can include a winning client 404, a losing client 404, a draw between clients 404, that a client 404 did not participate in the game, and/or ranks for the clients 404 etc.

FIG. 5 illustrates an example schema for a tournament definition. As discussed above, a tournament definition can specify configuration values that the unified platform for a plurality of titles and gaming devices uses as parameters when creating tournament instances for multiplayer tournaments. For instance, in the example of FIG. 5, the schema for the tournament definition includes a tournament definition name (e.g., "Holidays"), registration information (e.g., duration, maximum team count, and minimum team count), team information (e.g., minimum players and maximum players), stage information (e.g., single elimination and round information), and instance information (e.g., tournament instance name and start time for registration).

FIG. 6 illustrates an example schema for a tournament instance. As discussed above, a tournament instance can include a single run of a particular tournament definition. For instance, in the example of FIG. 6, the schema for the tournament includes properties of the tournament 602 and a configuration of the tournament 604. The properties of the tournament 602 include a name of the tournament, a description of the tournament, an organizer for the tournament, and strings for the tournament. The configuration of the tournament 604 defines the registration (e.g., start time, end time, and maximum teams), the teams (e.g., maximum and minimum number of players), and the stages (e.g., start time, the mode, and the rounds) for the tournament.

FIG. 7 illustrates an example schema for a team session. The example schema for the team session includes the configuration of the team session, the properties of the team, and the team members. For instance, the configuration for the team session defines that the tournament reference is "FaceItTournaments~12345, the registration state for the team includes registered, the start time of the team session, and the end time of the team session. The properties of the team define the name of the team as HelloWorldTeam, and the color of the team is blue. Additionally, although not illustrated in FIG. 7, the team members can list each of the players included in the team.

FIG. 8 illustrates an example schema for a match session. For instance, the example schema for the match session includes the constants for the match session, the server for the match session, the properties of the match session, and the members of the match session. The constants of the match session define a type of arbitration for the match session. The properties define the name of the map (e.g., Longest) and the mode of the match session (e.g., Team Slayer). The members of the match session a reference to the team session.

Figure 9:
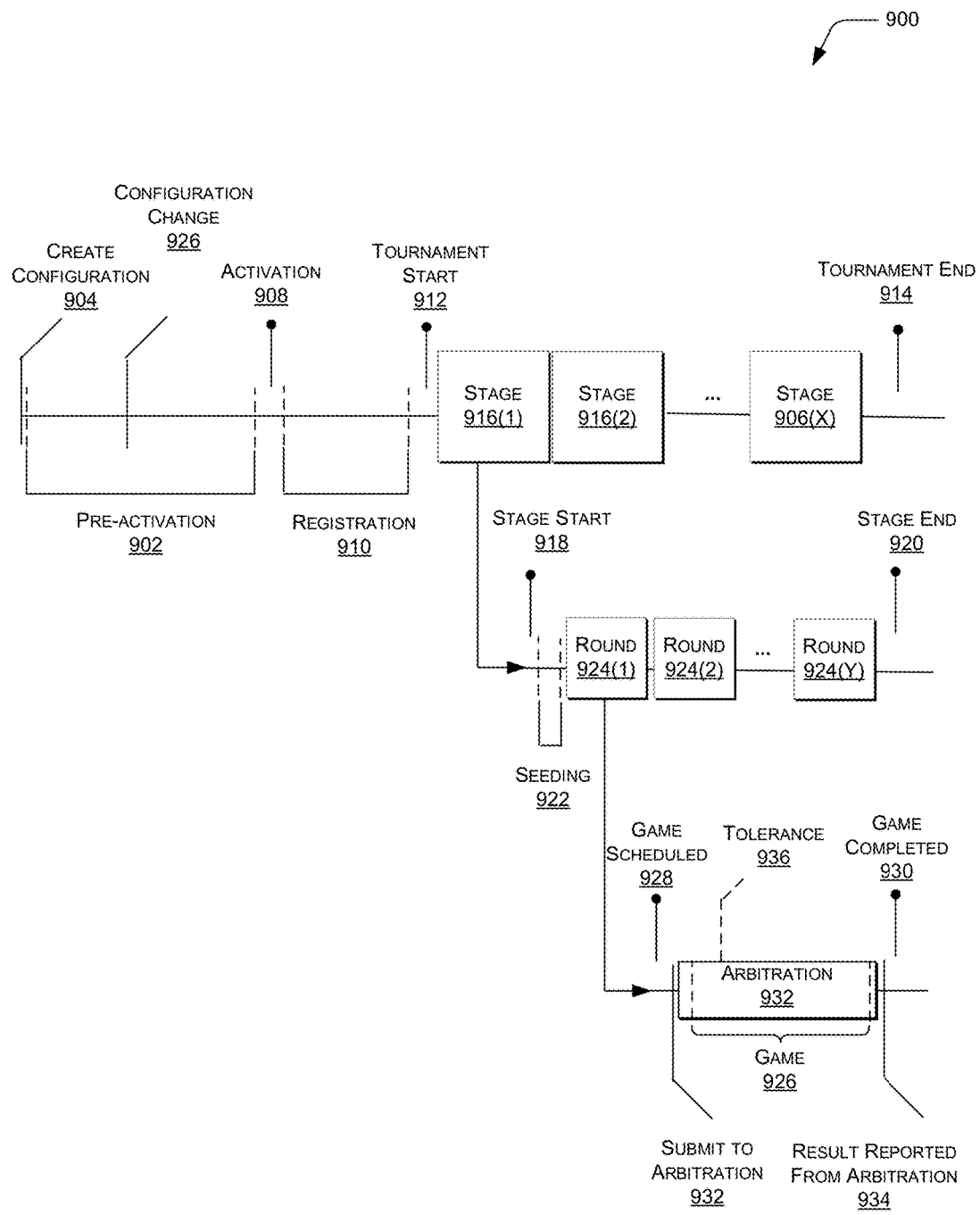
FIG. 9 illustrates an example flow diagram for a tournament service design.

FIG. 9 illustrates an example flow diagram 900 for a tournament. A tournament service that executes the flow diagram 900 can include the distributed computing resources 102, the unified platform(s) 202, and/or the computing device(s) described therewith in accordance with aspects of a service architecture 400. Computing device 300 (which is used to describe FIG. 9). The flow diagram 900 for the tournament service design begins with the pre-activation 902 of the tournament. In some examples, the pre-activation 902 can include creating the configuration 904 for the tournament and determining whether there are any configuration changes 906 after the creation. For instance, creating the configuration 904 can include the computing device 300 generating a tournament instance based on configuration values of a tournament definition. After creating the tournament instance, the computing device 300 can determine whether a game publisher, game developer, and/or tournament organizer of the tournament instance changed the configuration 906 of the tournament instance.

The flow diagram 900 further includes the activation 908 of the tournament instance. For instance, the tournament instance may include a start time for activating the tournament instance. At the start time, the computing device 300 activates 908 the tournament instance. In some examples, after activation 908 of the tournament instance, the game publisher, game developer, and/or tournament organizer can no longer change the configuration of the tournament.

After activation 908 of the tournament instance, the registration 910 for the tournament begins. During the registration, a player and/or a team of players may register for the tournament. For instance, a player may register his or her team by inputting information about the players of the team into a user interface provided by the computing device 300. In some examples, the game publisher, game developer, and/or tournament organizer defines configuration settings for the registration 910. The configuration settings may include a time period for the registration 910, a minimum/maximum number of teams for the tournament, a minimum/maximum number of players per team, or the like. Additionally or alternatively, in some examples, the game publisher, game developer, and/or tournament organizer further defines one or more parameters for registering with the tournament instance. For instance, the one or more parameters can define a location for players, an age limit for players, a skill level of players, or the like.

In some examples, registration 910 for the tournament ends at the end of the time period for registration 910. Additionally or alternatively, the registration 910 ends when a maximum number of teams is reached.

In some examples, when a team (e.g., client 404) is submitted for registration 910, the operation is recorded in an operation queue (e.g., operation queue 422). The client may then receive a result of the registration that indicates whether the registration operation was successfully inserted in the operation queue. Additionally, when the registration operation is successfully inserted in the operation queue, a workflow engine (e.g., workflow engine 410) can process the registration operation from the queue and write to an MPSD (e.g., MPSD 408) whether the write registration operation was successful or failed.

In some examples, a client can include one of many different registration states. Such states can include (a) a pending state, where registration was successfully received by the tournament service and will eventually be processed; (2) a rejected state, where registration could not be performed on the client; (3) a registered state, where registration has been confirmed by the tournament service and the client has been guaranteed a spot in the tournament; and (4) a complete state, wherein the client has completed its participation in the tournament.

The flow diagram further includes the start 912 of the tournament. In some examples, the tournament instance defines the start 912 of the tournament. In some examples, the start of 912 of the tournament occurs at the end of the registration 910 for the tournament. For instance, the start 912 of the tournament occurs when the maximum number of teams registers for the tournament. After a start 912 of the tournament, the tournament stays in progress until the end 914 of the tournament.

In some examples, progression through the tournament can include competing in a number of stages 916(1)-916(X). In some examples, each of the stages 916 of the tournament can include different elimination modes and/or game parameters. For instance, a first stage 916(1) can include a single elimination mode while a second stage 916(2) includes a double elimination mode. In some examples, each of the stages 916 of the tournament can include the same elimination mode and/or game parameters.

Each of the stages 916 of the tournament progresses from a start 918 of the respective stage 916 to an end 920 to the respective stage 916. In some examples, a seeding 922 is determined near the start 918 of the stage 916. In such examples, a tournament organizer (or game publisher and/or game developer) decides the starting position of each team within the stage 916. For instance, the tournament service and/or tournament organizer may determine the position of each team using a bracket. In some examples, the tournament service and/or tournament organizer determines the position for a team based on an overall ranking of the team coming into the tournament. In some examples, the tournament service and/or tournament organizer determines the position for a team based on a performance of the team in a preceding stage 916.

In some examples, one or more of the stages 916 may include one or more rounds 924(1)-924(Y). The number of rounds 924 per stage 916 of the tournament may depend on the elimination style of the respective stage 916. In some examples, rounds 924 within the stage 916 run in parallel. Additionally or alternatively, on some examples, rounds 924 within the stage 916 can run sequentially. In such examples, all games scheduled within the round 924 must complete beginning the next round 924 of the stage 916. In some examples, one or more of the rounds 924 may include a minimum/maximum duration before progressing to the next round 924.

In some examples, one more of the rounds 924 may include a game 926. While participating in a game 926, clients compete against one another from a time that the game is scheduled 928 until a time when the game is completed 930. During and/or after competing with one another during the game 926, the clients further participate in arbitration 932. Arbitration 932 can determine a winner of the game 926 based on the final results of the game 926.

For instance, in some examples, one or more of the clients of the game 926 can submit to arbitration 932. During arbitration, the one or more clients can transmit the results of the game 926 session. An MPSD (e.g., MPSD 408) can then use the results of the game 926 along with data about the clients to determine a final result that is reported from the arbitration 934. In some examples, when results from the clients do not completely match, the MPSD can determine the final result that is reported from the arbitration 934 using a tolerance 936. For instance, in some examples, the MPSD may use the most common result as the final result that is reported from the arbitration 934. Additionally or alternatively, in some examples, the MPSD may use an average of the results as the final result that is reported from the arbitration 934.

Example Processes

FIGS. 10-13 represent example processes in accordance with various examples from the description of FIGS. 1-9. Example functions shown in FIGS. 10-13 can be implemented on or otherwise embodied in one or more distributed computing resources 102, such as unified platform 202, and/or computing device(s) 106, 206, 300. In various examples, example functions can be implemented using Web pages served by a computing device(s) 106, 206, 300 and accessed by a computing device(s) 122, 208, 210, and/or 212, or as software running on distributed computing resources 102, such as unified platform 202, and/or computing device(s) 106, 206, 300. For the sake of illustration, the example processes are described below with reference to processing unit 302 in terminal 300. However, other processing unit(s) such as processing unit 108 and/or other components of such described computing device(s) can carry out step(s) of described example processes.

The order in which the operations are described in each example flow diagram is not intended to be construed as a limitation, and any number of the described operations can be combined in any order and/or in parallel to implement each process. Moreover, the operations in each of FIGS. 10-13 can be implemented in hardware, software, and/or a combination thereof. In the context of software, the operations represent computer-executable instructions that, when executed by one or more processors, cause one or more processors to perform the recited operations. For example, modules and other components described herein can be stored in a computer-readable media and executed by at least one processor to perform the described functions. In the context of hardware, the operations can represent logic functions implemented in circuitry, e.g., datapath-control and finite-state-machine sequencing functions.

Figure 10:
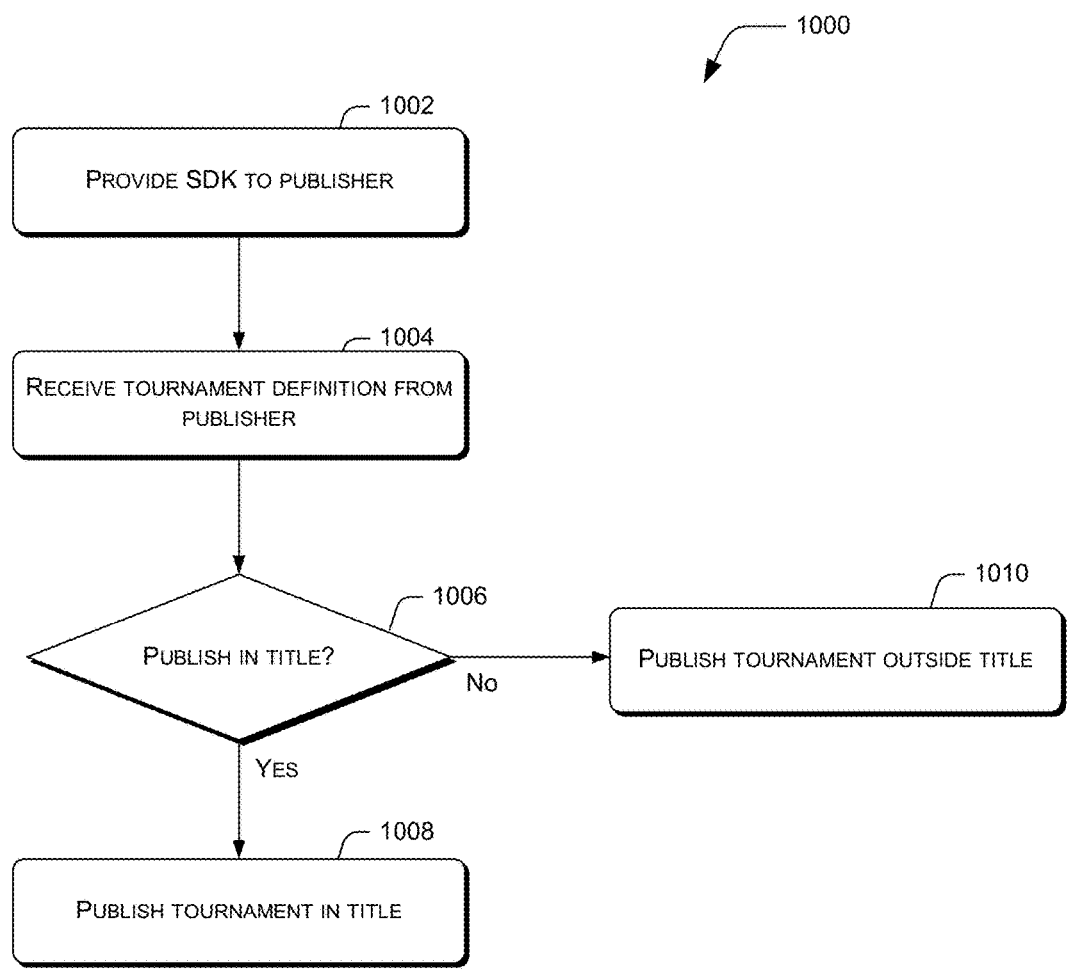
FIG. 10 is a flow diagram of an example method of providing a software development kit (SDK) to game publishers and/or game developers for multiple gaming platforms.

FIG. 10 is a flow diagram of an example method 1000 of providing a software development kit (SDK) to game publishers and/or game developers for multiple gaming platforms.

At block 1002, processing unit 302 can provide an SDK to a plurality of game publishers and/or game developers. In various examples, the game publishers can publish multiple titles and/or the game developers can develop titles for diverse gaming platforms.

At block 1004, processing unit 302 can receive a tournament definition from a game publisher and/or game developer. The tournament definition can define parameters for the tournament including where the tournament is to be published on gaming platforms, one or more of authorized tournament organizer(s) for the tournament, gaming platforms for the tournament, team qualifications and/or player qualifications for the tournament, etc. The processing unit 302 can receive a first tournament definition for the title from the first publisher and a second tournament definition for the title from a second publisher according to instructions contained within the SDK.

At block 1006, processing unit 302 determines whether the tournament is to be published within the title or outside the title according to the tournament definition.

At block 1008, processing unit 302 causes publication of the tournament within the title such that activation of the title causes publication of the tournament on authorized gaming platforms.

At block 1010, processing unit 302 causes publication of the tournament outside the title. In various examples, the tournament can be published on authorized gaming platforms absent activation of the title, the tournament can be published on alternative gaming platforms for viewing by registered spectators, the tournament can be published via a web page for viewing by registered spectators, etc.

In some examples, processing unit 302 causes publication of the title according to both of blocks 1008 and 1010 when consistent with the tournament definition.

Figure 11:
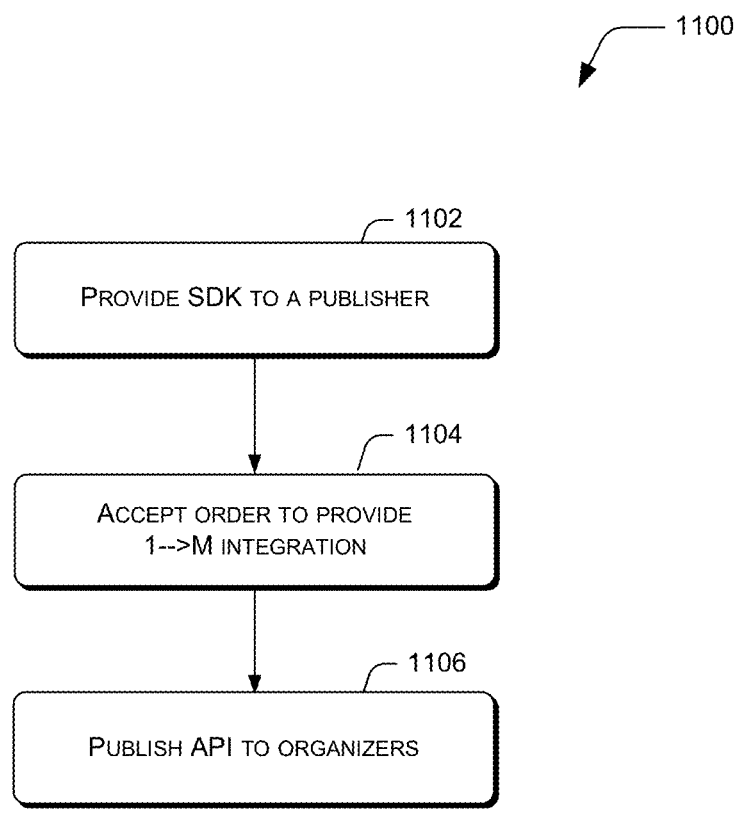
FIG. 11 is a flow diagram of an example method of serving as an intermediary for game publishers and/or game developers and tournament organizers with one-to-many (P:TO) integration for a title.

FIG. 11 is a flow diagram of an example method 1100 of serving as an intermediary for game publishers and/or game developers and tournament organizers with one-to-many (P: TO) integration of a title.

At block 1102, processing unit 302 can provide an SDK to one or more game publishers and/or game developers.

At block 1104, processing unit 302 can receive an order to provide one-to-many integration between one game publisher and/or game developer with and multiple tournament organizers. In some examples, the game publisher and/or game developer can provide the one-to-many integration order as part of a tournament definition. In some examples, the game publisher and/or game developer can provide the one-to-many integration order separate from a tournament definition.

At block 1106, processing unit 302 causes publication of application programming interfaces (APIs) to the multiple tournament organizers according to the order from the game publisher and/or game developer. In some examples, the APIs provide different levels of functionality to several of the multiple tournament organizers.

Figure 12:
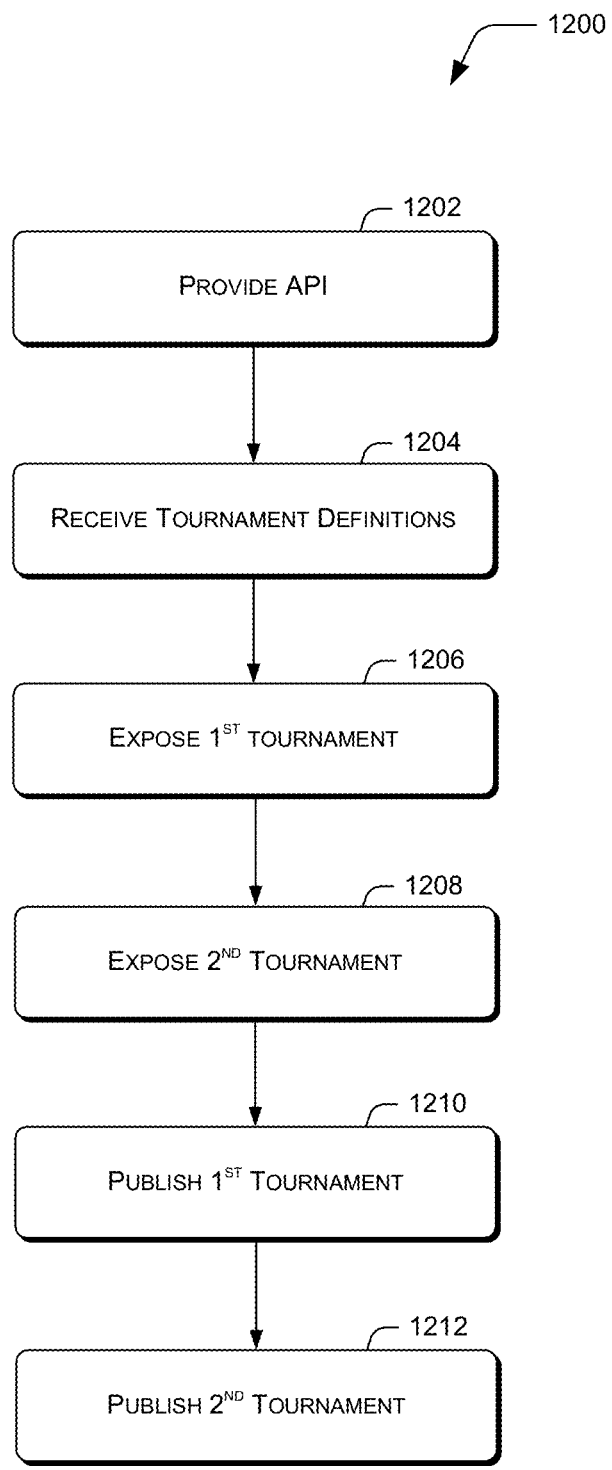
FIG. 12 is a flow diagram of an example method of providing APIs for a plurality of tournaments to be published within a title.

FIG. 12 is a flow diagram of an example method of providing APIs for a plurality of tournaments to be published within a title.

At block 1202, processing unit 302 can provide APIs to multiple tournament organizers for a title. In various examples, the APIs enable configuration of a plurality of tournaments for a same geographical region to be exposed within the title.

At block 1204, processing unit 302 can receive respective tournament definitions corresponding to the plurality of tournaments configured for the title via the API.

At block 1206, processing unit 302 can expose a first tournament of the plurality of tournaments as a first available tournament within the title via the API.

At block 1208, processing unit 302 can expose a second tournament of the plurality of tournaments as a second available tournament within the title via the API.

At block 1210, processing unit 302 can cause publication of the first available tournament within the title according to a first tournament definition.

At block 1212, processing unit 302 can cause publication of the second available tournament within the title according to a second tournament definition.

In various examples, the plurality of tournaments to be published within the title can be for a same geographical region.

Figure 13:
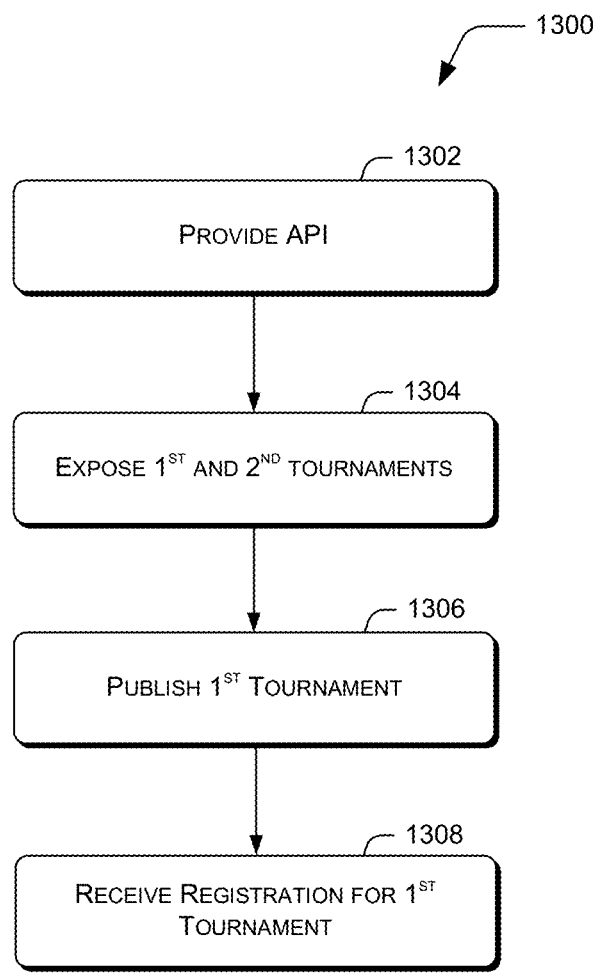
FIG. 13 is a flow diagram of an example method of serving as intermediary for team registration for tournaments one-to-many integration of a title.

FIG. 13 is a flow diagram of an example method of serving as intermediary for team registration for tournaments one-to-many integration of a title.

At block 1302, processing unit 302 can provide an API to augment a plurality of titles. In some examples, the API can enable configuration of a plurality of tournaments to be exposed within the plurality of titles.

At block 1304, processing unit 302 can expose a first tournament and a second tournament of the plurality of tournaments as a first available tournament and a second available tournament within a first title of the plurality of titles via the API.

At block 1306, processing unit 302 can cause publication of the first available tournament within the first title according to a first tournament definition including first criteria of teams qualifying for the first available tournament. In some examples, processing unit 302 can block publication of the second available tournament within the first title according to a second tournament definition including second criteria of teams qualifying for the second available tournament.

At block 1308, processing unit 302 can receive registration of a first team meeting the first criteria. In some examples, the registration can occur within the first title.

Example Clauses

A: A system comprising: a processor; a computer-readable medium having encoded thereon computer-executable instructions to configure the processor to: provide a software development kit (SDK) to a first publisher and a second publisher of a plurality of publishers, the SDK enabling the first publisher and the second publisher to configure a plurality of tournaments for a title; receive, by the system, a first tournament definition for the title from the first publisher, according to the SDK, e.g., instructions contained within the SDK; receive, by the system, a second tournament definition for the title from the second publisher, according to the SDK, e.g., instructions contained within the SDK; determine, by the system, whether at least one of the first tournament definition or the second tournament definition includes a declaration for publication of at least one of a first tournament or a second tournament of the plurality of tournaments within the title; and publish the first tournament and the second tournament according to the tournament definition.

B: A system as clause A recites, wherein at least the first tournament definition includes a plurality of tournament organizers authorized for the title.

C: A system as clause A or B recites, the computer-executable instructions further to configure the processor to expose an available tournament of the title to a plurality of tournament organizers via an application programming interface (API).

D: A system as any of clauses A-C recites, the computer-executable instructions further to configure the processor to expose details of the title having the available tournament via the API for at least a first of the plurality of tournament organizers and not for at least a second of the plurality of tournament organizers to use in running the available tournament.

E: A system as clause D recites, the computer-executable instructions further to configure the processor to expose a shared library to integrate the available tournament in the title.

F: A system as any of clauses A-E recites, the computer-executable instructions further to configure the processor to expose an available tournament within the title via an application programming interface (API).

G: A system as any of clauses A-F recites, the computer-executable instructions further to configure the processor to: expose an available tournament for the title to a plurality of tournament organizers via an application programming interface (API); expose a first set of details of the title having the available tournament via the API to at least a first of the plurality of tournament organizers to use in running the tournament as the first tournament; and expose a second set of details of the title having the available tournament via the API to at least a second of the plurality of tournament organizers to use in running the second tournament.

H: A system comprising: means for processing; means for providing a software development kit (SDK) to a first publisher and a second publisher of a plurality of publishers, the SDK enabling the first publisher and the second publisher to configure a plurality of tournaments for a title; means for receiving a first tournament definition for the title from the first publisher, according to the SDK, e.g., instructions contained within the SDK; means for receiving a second tournament definition for the title from the second publisher, according to the SDK, e.g., instructions contained within the SDK; means for determining whether at least one of the first tournament definition or the second tournament definition includes a declaration for publication of at least one of a first tournament or a second tournament of the plurality of tournaments within the title; and means for publishing the first tournament and the second tournament according to the tournament definition.

I: A system as clause H recites, wherein at least the first tournament definition includes a plurality of tournament organizers authorized for the title.

J: A system as clause A or B recites, further comprising means for exposing an available tournament of the title to a plurality of tournament organizers via an application programming interface (API).

K: A system as any of clauses H-J recites, further comprising means for exposing details of the title having the available tournament via the API for at least a first of the plurality of tournament organizers and not for at least a second of the plurality of tournament organizers to use in running the available tournament.

L: A system as clause K recites, further comprising means for exposing a shared library to integrate the available tournament in the title.

M: A system as any of clauses H-L recites, further comprising means for exposing an available tournament within the title via an application programming interface (API).

N: A system as any of clauses H-M recites, further comprising: means for exposing an available tournament for the title to a plurality of tournament organizers via an application programming interface (API); means for exposing a first set of details of the title having the available tournament via the API to at least a first of the plurality of tournament organizers to use in running the tournament as the first tournament; and means for exposing a second set of details of the title having the available tournament via the API to at least a second of the plurality of tournament organizers to use in running the second tournament.

O: A method comprising: providing a software development kit (SDK) to a first publisher and a second publisher of a plurality of publishers, the SDK enabling the first publisher and the second publisher to configure a plurality of tournaments for a title; receiving a first tournament definition for the title from the first publisher, according to the SDK, e.g., instructions contained within the SDK; receiving a second tournament definition for the title from the second publisher, according to the SDK, e.g., instructions contained within the SDK; determining whether at least one of the first tournament definition or the second tournament definition includes a declaration for publication of at least one of a first tournament or a second tournament of the plurality of tournaments within the title; and publishing the first tournament and the second tournament according to the tournament definition.

P: A method as clause O recites, wherein at least the first tournament definition includes a plurality of tournament organizers authorized for the title.

Q: A method as clause O or P recites, further comprising exposing an available tournament of the title to a plurality of tournament organizers via an application programming interface (API).

R: A method as any of clauses O-Q recites, further comprising exposing details of the title having the available tournament via the API for at least a first of the plurality of tournament organizers and not for at least a second of the plurality of tournament organizers to use in running the available tournament.

S: A method as clause R recites, further comprising exposing a shared library to integrate the available tournament in the title.

T: A method as any of clauses O-S recites, further comprising exposing an available tournament within the title via an application programming interface (API).

U: A method as any of clauses O-T recites, further comprising exposing an available tournament for the title to a plurality of tournament organizers via an application programming interface (API); exposing a first set of details of the title having the available tournament via the API to at least a first of the plurality of tournament organizers to use in running the tournament as the first tournament; and exposing a second set of details of the title having the available tournament via the API to at least a second of the plurality of tournament organizers to use in running the second tournament.

V: A method comprising: providing a software development kit (SDK) containing a plurality of application programming interfaces (APIs) to a plurality of publishers; accepting an order from a first publisher of the plurality of publishers to provide one-to-many integration of a title for a tournament to tournament organizers represented in a list; and publishing the APIs to the tournament organizers represented in the list.

W. A method as clause V recites, further comprising: accepting a tournament definition associated with the title from the first publisher; in some instances, incorporating the tournament definition into the API; and surfacing to the tournament organizers represented in the list, a tournament as an available tournament according to the tournament definition.

X: A method as clause V or W recites, further comprising exposing details of the title having the available tournament via the API for use by at least one of the plurality of tournament organizers in running the tournament.

Y: A method as any of clauses V-X recites, further comprising exposing a shared library to integrate the tournament in the title.

Z: A method as any of clauses V-Y recites, further comprising exposing an available tournament within the title via an API of the plurality of APIs.

AA: A method as any of clauses V-Z recites, further comprising exposing an API of the plurality of APIs to the first publisher to manage a published tournament.

AB: A method as any of clauses V-AA recites, further comprising: accepting respective orders from the plurality of publishers to provide respective one-to-many integration of a plurality of titles for a plurality of tournaments to tournament organizers represented in respective lists; and publishing the APIs to the tournament organizers represented in the respective lists.

AC: A method as any of clauses V-AB recites, further comprising: accepting respective tournament definitions associated with the plurality of titles from the plurality of publishers; in some instances incorporating the tournament definitions into the API; and surfacing to the tournament organizers represented in the list, the plurality of tournaments as available tournaments according to the tournament definitions.

AD: A computer-readable medium comprising computer-executable instructions to, upon execution, configure a computer to perform a method as any of clauses V-AC recites.

AE: A system comprising: a processor coupled to a computer-readable medium comprising computer-executable instructions to, upon execution, configure a computer to perform a method as any of clauses V-AC recites.

AF: A system comprising: means for providing a software development kit (SDK) containing a plurality of application programming interfaces (APIs) to a plurality of publishers; means for accepting an order from a first publisher of the plurality of publishers to provide one-to-many integration of a title for a tournament to tournament organizers represented in a list; and means for publishing the APIs to the tournament organizers represented in the list.

AG: A system as clause AF recites, further comprising: means for accepting a tournament definition associated with the title from the first publisher; means for incorporating the tournament definition into the API; and means for surfacing to the tournament organizers represented in the list, a tournament as an available tournament according to the tournament definition.

AH: A system as clause AF or AG recites, further comprising means for exposing details of the title having the available tournament via the API for use by at least one of the plurality of tournament organizers in running the tournament.

AI: A system as any of clauses AF-AH recites, further comprising means for exposing a shared library to integrate the tournament in the title.

AJ: A system as any of clauses AF-AI recites, further comprising means for exposing an available tournament within the title via an API of the plurality of APIs.

AK: A system as any of clauses AF-AJ recites, further comprising means for exposing an API of the plurality of APIs to the first publisher to manage a published tournament.

AL: A system as any of clauses AF-AK recites, further comprising: means for accepting respective orders from the plurality of publishers to provide respective one-to-many integration of a plurality of titles for a plurality of tournaments to tournament organizers represented in respective lists; and means for publishing the APIs to the tournament organizers represented in the respective lists.

AM: A system as any of clauses AF-AL recites, further comprising: means for accepting respective tournament definitions associated with the plurality of titles from the plurality of publishers; means for incorporating the tournament definitions into the API; and means for surfacing to the tournament organizers represented in the list, the plurality of tournaments as available tournaments according to the tournament definitions.

AN: A computer-executable application programming interface (API) embodied on a computer-readable medium, the API comprising: a tournament creation service to define a publisher interface including a publisher-interface element accessible by at least a first publisher and a second publisher in a lightweight data-interchange format; a compiler service to provide at least part of the publisher-organizer interface element to a compiler such that the compiler compiles the publisher-interface element to machine code executable to present the publisher interface defined in the lightweight data-interchange format.

AO: An API as clause AN recites, wherein the API facilitates developer building of tournament hooks for presentation of a tournament in a title.

AP: A computer-executable API as clause AN or AO recites, wherein the API facilitates tournament organizer publication of a tournament via the tournament hooks for presentation of the tournament in the title.

AQ: A computer-executable API as any of clauses AN-AP recites, wherein: the tournament creation service is further to define a tournament-organizer interface including a tournament-organizer interface element accessible by at least a first tournament organizer and a second tournament organizer in the lightweight data-interchange format; and the compiler service is further to provide at least part of the tournament-organizer interface element to a compiler such that the compiler compiles the tournament-organizer interface element to machine code executable to present the tournament-organizer interface defined in the lightweight data-interchange format.

AR: A computer-executable API as any of clauses AN-AQ recites, configured to enable developers to build tournaments for a plurality of client platforms.

AS: A system comprising a processor and an API as any of clauses AN-AR recites.

AT: A system comprising: a processor; a computer-readable medium having encoded thereon computer-executable instructions to configure the processor to: provide an application programming interface (API) for a title, the API enabling configuration of a plurality of tournaments for a same geographical region to be exposed within a title; receive, by the system, respective tournament definitions corresponding to the plurality of tournaments configured for the title via the API; expose a first tournament and a second tournament of the plurality of tournaments as a first available tournament and a second available tournament within the title via the API; and publish the first available tournament and the second available tournament within the title according to respective tournament definitions.

AU: A system as clause AT recites, wherein a first tournament definition of the respective tournament definitions includes parameters for the first available tournament.

AV: A system as clause AT or AU recites, the computer-executable instructions further to configure the processor to expose the first available tournament of the title to a plurality of user devices associated with a plurality of user accounts via the API.

AW: A system as clause AV recites, the computer-executable instructions further to configure the processor to expose details of the first available tournament via the API for the plurality of user accounts to use in registering to observe the first tournament.

AX: A system as any of clauses AT-AW recites, the computer-executable instructions further to configure the processor to expose details of the first available tournament via the API for at least a first of the plurality of user accounts to use in registering to participate in the first tournament.

AY: A system as any of clauses AT-AX recites, the computer-executable instructions further to configure the processor to send an alert regarding the first tournament to a user device associated with the first user account.

AZ: A system as any of clauses AT-AY recites, the computer-executable instructions further to configure the processor to: receive an indication of a result of a match in the first tournament; identify the tournament participants involved in the match; store respective indications of win or loss associated with respective of the tournament participants involved in the match; ascertain a next match of the respective tournament participants; and surface, in the title, the indication of the result of the match and the next match of the respective tournament participants.

BA: A system as any of clauses AT-AZ recites, the computer-executable instructions further to configure the processor to: accept registration of a tournament participant; receive an indication of success of the tournament participant; store the indication of success of the tournament participant; ascertain a next match of the tournament participant; and surface, in the title, the indication of success and the next match of the tournament participant.

BB: A system as any of clauses AT-BA recites, the computer-executable instructions further to configure the processor to register a participant or a team to compete in a plurality of tournaments.

BC: A system as any of clauses AT-BB recites, wherein the plurality of tournaments are run by a plurality of tournament organizers.

BD: A system as any of clauses AT-BC recites, the computer-executable instructions further to configure the processor to receive a result of the first tournament.

BE: A system comprising: means for processing; means for providing an application programming interface (API) for a title, the API enabling configuration of a plurality of tournaments for a same geographical region to be exposed within a title; means for receiving respective tournament definitions corresponding to the plurality of tournaments configured for the title via the API; means for exposing a first tournament and a second tournament of the plurality of tournaments as a first available tournament and a second available tournament within the title via the API; and means for publishing the first available tournament and the second available tournament within the title according to respective tournament definitions.

BF: A system as clause BE recites, wherein a first tournament definition of the respective tournament definitions includes parameters for the first available tournament.

BG: A system as clause BE or BF recites, further comprising means for exposing the first available tournament of the title to a plurality of user devices associated with a plurality of user accounts via the API.

BH: A system as any of clauses BE-BG recites, further comprising means for exposing details of the first available tournament via the API for the plurality of user accounts to use in registering to observe the first tournament.

BI: A system as any of clauses BE-BH recites, further comprising means for exposing details of the first available tournament via the API for at least a first of the plurality of user accounts to use in registering to participate in the first tournament.

BJ: A system as any of clauses BE-BI recites, further comprising means for sending an alert regarding the first tournament to a user device associated with the first user account.

BK: A system as any of clauses BE-BJ recites, further comprising: means for receiving an indication of a result of a match in the first tournament; means for identifying the tournament participants involved in the match; means for storing respective indications of win or loss associated with respective of the tournament participants involved in the match; means for ascertaining a next match of the respective tournament participants; and means for surfacing, in the title, the indication of the result of the match and the next match of the respective tournament participants.

BL: A system as any of clauses BE-BK recites, further comprising: means for accepting registration of a tournament participant; means for receiving an indication of success of the tournament participant; means for storing the indication of success of the tournament participant; means for ascertaining a next match of the tournament participant; and means for surfacing, in the title, the indication of success and the next match of the tournament participant.

BM: A system as any of clauses BE-BL recites, further comprising means for registering a participant or a team to compete in a plurality of tournaments.

BN: A system as any of clauses BE-BM recites, wherein the plurality of tournaments are run by a plurality of tournament organizers.

BO: A system as any of clauses BE-BN recites, further comprising means for receiving a result of the first tournament.

BP: A method comprising: providing an application programming interface (API) for a title, the API enabling configuration of a plurality of tournaments for a same geographical region to be exposed within a title; receiving respective tournament definitions corresponding to the plurality of tournaments configured for the title via the API; exposing a first tournament and a second tournament of the plurality of tournaments as a first available tournament and a second available tournament within the title via the API; and publishing the first available tournament and the second available tournament within the title according to respective tournament definitions.

BQ: A method as clause BP recites, wherein a first tournament definition of the respective tournament definitions includes parameters for the first available tournament.

BR: A method as clause BP or BQ recites, further comprising exposing the first available tournament of the title to a plurality of user devices associated with a plurality of user accounts via the API.

BS: A method as any of clauses BP-BR recites, further comprising exposing details of the first available tournament via the API for the plurality of user accounts to use in registering to observe the first tournament.

BT: A method as any of clauses BP-BS recites, further comprising exposing details of the first available tournament via the API for at least a first of the plurality of user accounts to use in registering to participate in the first tournament.

BU: A method as any of clauses BP-BT recites, further comprising sending an alert regarding the first tournament to a user device associated with the first user account.

BV: A method as any of clauses BP-BU recites, further comprising: receiving an indication of a result of a match in the first tournament; identifying the tournament participants involved in the match; storing respective indications of win or loss associated with respective of the tournament participants involved in the match; ascertaining a next match of the respective tournament participants; and surfacing, in the title, the indication of the result of the match and the next match of the respective tournament participants.

BW: A method as any of clauses BP-BV recites, further comprising: accepting registration of a tournament participant; receiving an indication of success of the tournament participant; storing the indication of success of the tournament participant; ascertaining a next match of the tournament participant; and surfacing, in the title, the indication of success and the next match of the tournament participant.

BX: A method as any of clauses BP-BW recites, further comprising registering a participant or a team to compete in a plurality of tournaments.

BY: A method as any of clauses BP-BX recites, wherein the plurality of tournaments are run by a plurality of tournament organizers.

BZ: A method as any of clauses BP-BY recites, further comprising receiving a result of the first tournament.

CA: A computer-readable medium including computer-readable instructions to, upon execution, configure a computer to perform a method as any of clauses BP-BZ recites.

CB: A method comprising: providing an application programming interface (API) to augment a plurality of titles, the API enabling configuration of a plurality of tournaments to be exposed within the plurality of titles; exposing a first tournament and a second tournament of the plurality of tournaments as a first available tournament and a second available tournament within a first title of the plurality of titles via the API; publishing the first available tournament within the first title according to a first tournament definition including first criteria of teams qualifying for the first available tournament; and receiving registration of a first team meeting the first criteria, the registration occurring within the first title.

CC: A method as clause CB recites, further comprising: publishing the second available tournament within the first title according to a second tournament definition including second criteria of teams qualifying for the second available tournament; and receiving registration of a second team meeting the second criteria, the registration occurring within the first title.

CD: A method as clause CC recites, wherein the first criteria differs from the second criteria.

CE: A method as any of clauses CB-CD recites, further comprising surfacing the first tournament during play to spectators and blocking registered tournament participants of the first tournament from spectating the first tournament.

CF: A method as any of clauses CB-CE recites, further comprising alerting members of the first team a predetermined period of time in advance of a scheduled match.

CG: A computer-readable medium including computer-readable instructions to, upon execution, configure a computer to perform a method as any of clauses CB-CF recites.

CH: A system comprising a processor and a computer-readable medium including computer-readable instructions to, upon execution, configure a computer to perform a method as any of clauses CB-CF recites.

CI: A system comprising: means for providing an application programming interface (API) to augment a plurality of titles, the API enabling configuration of a plurality of tournaments to be exposed within the plurality of titles; means for exposing a first tournament and a second tournament of the plurality of tournaments as a first available tournament and a second available tournament within a first title of the plurality of titles via the API; means for publishing the first available tournament within the first title according to a first tournament definition including first criteria of teams qualifying for the first available tournament; and means for receiving registration of a first team meeting the first criteria, the registration occurring within the first title.

CJ: A system as clause CI recites, further comprising: means for publishing the second available tournament within the first title according to a second tournament definition including second criteria of teams qualifying for the second available tournament; and means for receiving registration of a second team meeting the second criteria, the registration occurring within the first title.

CK: A system as clause CJ recites, wherein the first criteria differs from the second criteria.

CL: A system as any of clauses CI-CK recites, further comprising means for surfacing the first tournament during play to spectators and blocking registered tournament participants of the first tournament from spectating the first tournament.

CM: A method as any of clauses CI-CL recites, further comprising means for alerting members of the first team a predetermined period of time in advance of a scheduled match.

CN. A graphical user interface (GUI) within a title, the GUI comprising: an available tournament area configured to present a plurality of tournaments scheduled for the title by at least a first publisher or tournament organizer and a second publisher or tournament organizer; and a registration area to indicate registration as a spectator, a competitor, or a team.

CO: A GUI as clause CN recites, wherein the registration area is configured to limit registration as a spectator in an event an individual is registered as the competitor or as part of the team.

CP: A GUI as clause CO recites, wherein the registration area is configured to allow registration as a spectator in an event the individual is deregistered as the competitor or as part of the team.

CQ: A GUI as any of clauses CN-CP recites, wherein the registration area is configured to accept registration of the competitor or the team for a plurality of tournaments.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 106, 206, and/or 300 such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:
1. A system comprising:
a memory; and
a processor in communication with the memory, wherein the processor is configured to:
provide a software development kit (SDK) to a first publisher and a second publisher of a plurality of publishers, the SDK enabling the first publisher and the second publisher to configure a plurality of tournaments for a title;
receive, by the system, a first tournament definition and one or more first permission levels for the title from the first publisher, according to the SDK, wherein the one or more first permission levels define which of a plurality of tournament organizers are able to create tournament definitions or view tournament instances for the title, wherein the one or more first permission levels further define parameters for the plurality of tournament organizers to follow when creating the plurality of tournaments for the title;
receive, by the system, a second tournament definition and one or more second permission levels for the title from the second publisher, according to the SDK, wherein the one or more second permission levels define which of the plurality of tournament organizers are able to create tournament definitions or view tournament instances for the title, wherein the one or more second permission levels further define parameters for the plurality of tournament organizers to follow when creating the plurality of tournaments for the title;

determine, by the system, whether at least one of the first tournament definition or the second tournament definition includes a declaration for publication of at least one of a first tournament or a second tournament of the plurality of tournaments within the title; and publish the first tournament and the second tournament according to the tournament definition.

2. The system of claim 1, wherein at least the first tournament definition includes the plurality of tournament organizers authorized for the title.

3. The system of claim 1, wherein the processor is further configured to expose an available tournament of the title to the plurality of tournament organizers via an application programming interface (API).

4. The system of claim 3, wherein the processor is further configured to expose details of the title having the available tournament via the API for at least a first of the plurality of tournament organizers and not for at least a second of the plurality of tournament organizers to use in running the available tournament.

5. The system of claim 3, wherein the processor is further configured to expose a shared library to integrate the available tournament in the title.

6. The system of claim 1, wherein the processor is further configured to expose an available tournament within the title via an application programming interface (API).

7. The system of claim 1, wherein the processor is further configured to:
expose an available tournament for the title to the plurality of tournament organizers via an application programming interface (API);
expose a first set of details of the title having the available tournament via the API to at least a first of the plurality of tournament organizers to use in running the tournament as the first tournament; and
expose a second set of details of the title having the available tournament via the API to at least a second of the plurality of tournament organizers to use in running the second tournament.

8. A method comprising:
providing, by a system, a software development kit (SDK) to a first publisher and a second publisher of a plurality of publishers, the SDK enabling the first publisher and the second publisher to configure a plurality of tournaments for a title;
receiving, by the system, a first tournament definition and one or more first permission levels for the title from the first publisher, according to the SDK, wherein the one or more first permission levels define which of a plurality of tournament organizers are able to create tournament definitions or view tournament instances for the title, wherein the one or more first permission levels further define parameters for the plurality of tournament organizers to follow when creating the plurality of tournaments for the title;
receiving, by the system, a second tournament definition and one or more second permission levels for the title from the second publisher, according to the SDK, wherein the one or more second permission levels define which of the plurality of tournament organizers are able to create tournament definitions or view tournament instances for the title, wherein the one or more second permission levels further define parameters for the plurality of tournament organizers to follow when creating the plurality of tournaments for the title;

determining, by the system, whether at least one of the first tournament definition or the second tournament definition includes a declaration for publication of at least one of a first tournament or a second tournament of the plurality of tournaments within the title; and
publishing, by the system, the first tournament and the second tournament according to the tournament definition.

9. The method of claim 8, wherein at least the first tournament definition includes the plurality of tournament organizers authorized for the title.

10. The method of claim 8, further comprising exposing an available tournament of the title to the plurality of tournament organizers via an application programming interface (API).

11. The method of claim 10, further comprising exposing details of the title having the available tournament via the API for at least a first of the plurality of tournament organizers and not for at least a second of the plurality of tournament organizers to use in running the available tournament.

12. The method of claim 10, further comprising exposing a shared library to integrate the available tournament in the title.

13. The method of claim 8, further comprising exposing an available tournament within the title via an application programming interface (API).

14. The method of claim 8, further comprising:
exposing an available tournament for the title to the plurality of tournament organizers via an application programming interface (API);
exposing a first set of details of the title having the available tournament via the API to at least a first of the plurality of tournament organizers to use in running the tournament as the first tournament; and
exposing a second set of details of the title having the available tournament via the API to at least a second of the plurality of tournament organizers to use in running the second tournament.

15. A computer-readable physical device storing computer code executable by a processor, comprising:
code for providing, by a system, a software development kit (SDK) to a first publisher and a second publisher of a plurality of publishers, the SDK enabling the first publisher and the second publisher to configure a plurality of tournaments for a title;
code for receiving, by the system, a first tournament definition and one or more first permission levels for the title from the first publisher, according to the SDK, wherein the one or more first permission levels define which of a plurality of tournament organizers are able to create tournament definitions or view tournament instances for the title, wherein the one or more first permission levels further define parameters for the plurality of tournament organizers to follow when creating the plurality of tournaments for the title;
code for receiving, by the system, a second tournament definition and one or more second permission levels for the title from the second publisher, according to the SDK, wherein the one or more second permission levels define which of the plurality of tournament organizers are able to create tournament definitions or view tournament instances for the title, wherein the one or more second permission levels further define parameters for the plurality of tournament organizers to follow when creating the plurality of tournaments for the title;

code for determining, by the system, whether at least one of the first tournament definition or the second tournament definition includes a declaration for publication of at least one of a first tournament or a second tournament of the plurality of tournaments within the title; and code for publishing, by the system, the first tournament and the second tournament according to the tournament definition.

\* \* \* \* \*